(12) United States Patent
Burkhart

(10) Patent No.: US 8,707,701 B2
(45) Date of Patent: Apr. 29, 2014

(54) ULTRA-HIGH-EFFICIENCY ENGINES AND CORRESPONDING THERMODYNAMIC SYSTEM

(75) Inventor: James A. Burkhart, Strongsville, OH (US)

(73) Assignee: Burkhart Technologies, LLC, Strongsville, OH (US)

( * ) Notice: Subject to any disclaimer, the term of this patent is extended or adjusted under 35 U.S.C. 154(b) by 266 days.

(21) Appl. No.: 13/089,984

(22) Filed: Apr. 19, 2011

(65) Prior Publication Data

US 2011/0252796 A1 Oct. 20, 2011

Related U.S. Application Data

(63) Continuation-in-part of application No. PCT/US2009/061210, filed on Oct. 20, 2009.

(60) Provisional application No. 61/106,823, filed on Oct. 20, 2008, provisional application No. 61/227,597, filed on Jul. 22, 2009, provisional application No. 61/434,179, filed on Jan. 19, 2011.

(51) Int. Cl.
*F01K 27/02* (2006.01)
*F03G 7/04* (2006.01)

(52) U.S. Cl.
USPC ............................. 60/655; 60/641.2; 60/670

(58) Field of Classification Search
CPC ........... F01K 27/02; F02C 7/141; F02C 7/143
USPC ................ 60/643–683; 62/238.6, 238.7, 501, 62/238.4
See application file for complete search history.

(56) References Cited

U.S. PATENT DOCUMENTS

| | | | | |
|---|---|---|---|---|
| 1,961,784 A | * | 6/1934 | Roe | ................................. 60/649 |
| 2,982,864 A | * | 5/1961 | Furreboe | ........................... 290/2 |
| 3,224,199 A | * | 12/1965 | Best | ................................ 60/650 |

(Continued)

FOREIGN PATENT DOCUMENTS

| | | | | |
|---|---|---|---|---|
| EP | 0008680 A2 | * | 3/1980 | ................. F24J 3/04 |
| JP | 2005-077050 A | | 3/2005 | |
| JP | 2005-337065 A | | 12/2005 | |

OTHER PUBLICATIONS

International Preliminary Report on Patentability from corresponding Patent Cooperation Treaty Patent Application No. PCT/US2009/061210 mailed May 5, 2011.

(Continued)

*Primary Examiner* — Thomas Denion
*Assistant Examiner* — Laert Dounis
(74) *Attorney, Agent, or Firm* — Gardner, Linn, Burkhart & Flory, LLP

(57) ABSTRACT

A thermodynamic system and method of producing useful work includes providing a working fluid and a fluid pump, or compressor, for pumping the working fluid in a cycle. A thermal input is provided for supplying heat to the working fluid. An expansion device downstream of the thermal input converts motion of the working fluid to useful work. A heat pump is provided. A number of different means of implementing the heat pump are presented, including direct transfer of working fluid mass flow. The heat pump pumps heat from one portion of the working fluid to another portion of the working fluid. For some applications, a regenerator, or recuperator, may be used to transfer heat from a high temperature portion of the working fluid to a lower temperature portion.

28 Claims, 37 Drawing Sheets

(56) References Cited

U.S. PATENT DOCUMENTS

| | | | |
|---|---|---|---|
| 3,857,244 A * | 12/1974 | Faucette | 60/641.2 |
| 4,218,891 A * | 8/1980 | Schwartzman | 62/116 |
| 4,292,809 A * | 10/1981 | Bjorklund | 60/676 |
| 4,475,343 A * | 10/1984 | Dibelius et al. | 60/648 |
| 4,905,481 A | 3/1990 | Scaringe et al. | |
| 5,419,117 A * | 5/1995 | Greene | 60/224 |
| 6,041,604 A * | 3/2000 | Nicodemus | 60/671 |
| 7,062,913 B2 * | 6/2006 | Christensen et al. | 60/651 |
| 7,866,157 B2 | 1/2011 | Ernst et al. | |
| 2008/0006040 A1 * | 1/2008 | Peterson et al. | 62/116 |
| 2008/0041057 A1 * | 2/2008 | Thomas | 60/683 |

OTHER PUBLICATIONS

International Search Report and Written Opinion of the International Searching Authority from corresponding Patent Cooperation Treaty (PCT) Application No. PCT/US2009/061210, mailed May 10, 2010.

* cited by examiner

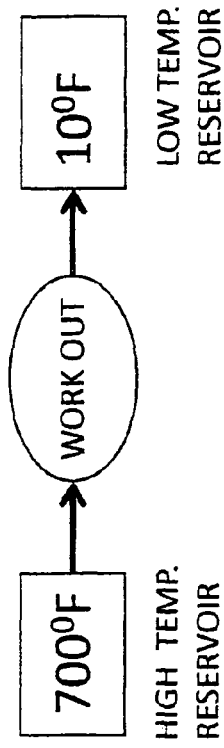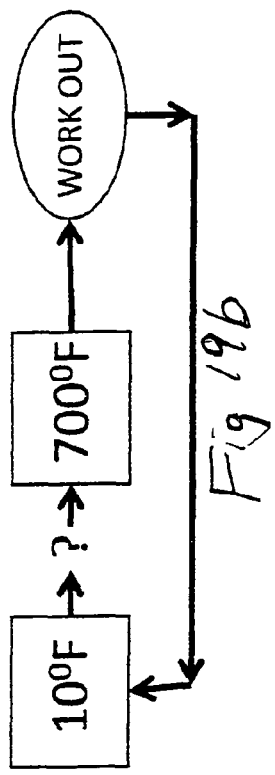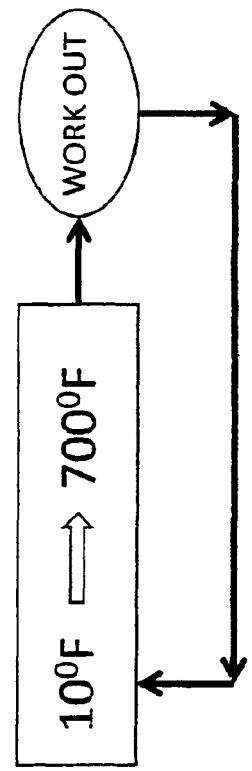
1. CLASSICAL DEPICTION OF HEAT ENGINE
2. BRING RESERVOIRS CLOSE TO EACH OTHER
3. MERGE RESERVOIRS INTO A CONTINUUM

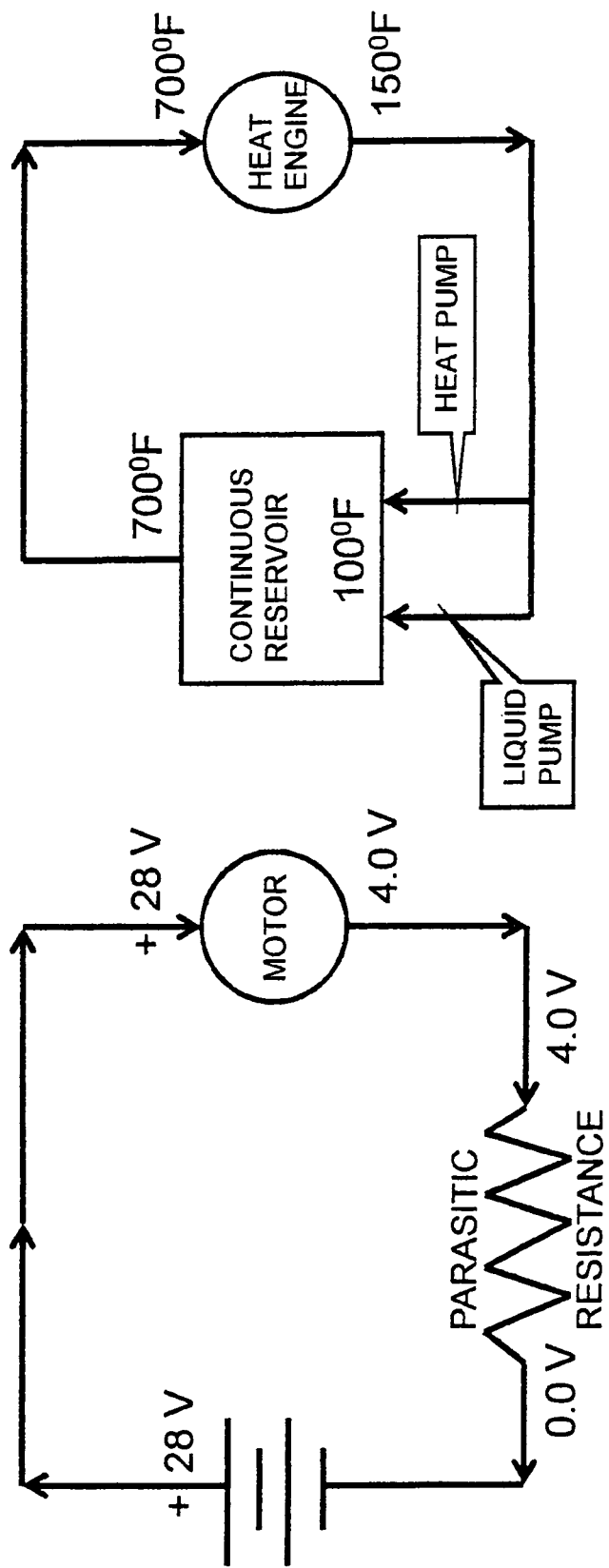

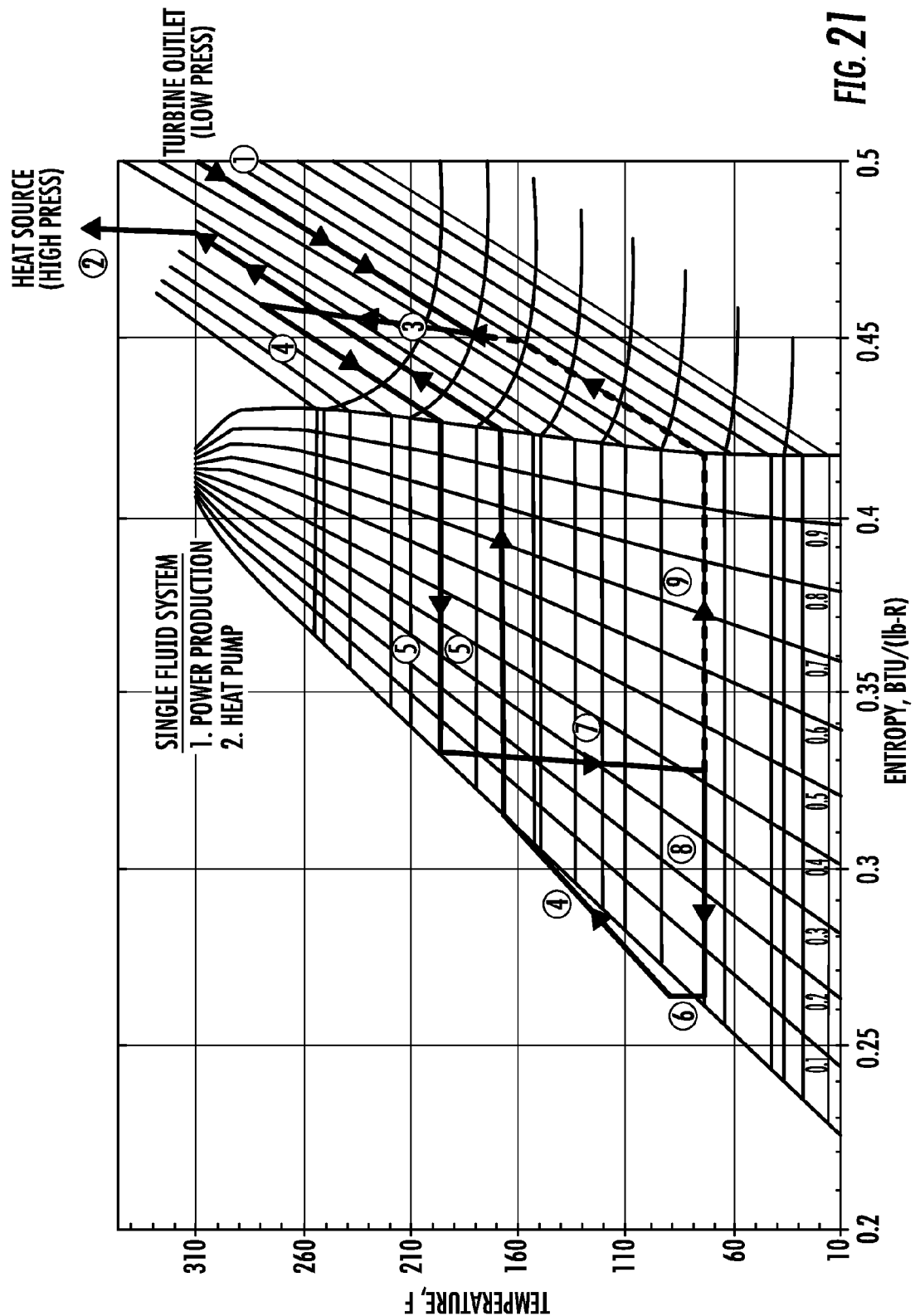

ULTRA-HIGH-EFFICIENCY ENGINES AND CORRESPONDING THERMODYNAMIC SYSTEM

CROSS REFERENCE TO RELATED APPLICATIONS

This application is a continuation-in-part of International Patent Application No. PCT/US09/61210, filed on Oct. 20, 2009, which claims priority from U.S. provisional patent application Ser. No. 61/106,823, filed on Oct. 20, 2008, and U.S. provisional patent application Ser. No. 61/227,597, filed on Jul. 22, 2009; and this application claims, priority from U.S. provisional patent application Ser. No. 61/434,179, filed on Jan. 19, 2011, the disclosures of which are hereby incorporated herein by reference in their entireties.

BACKGROUND OF THE INVENTION

The present invention is directed to a thermodynamic system and a method of producing work and, in particular, to such system and method having efficiency enhancing techniques.

Engine-efficiency is traditionally defined as the percentage of useful work produced by an engine divided by the heat input to the engine. In the case of complex power plants, jet engines, gasoline engines, diesel-engines, geothermal engines, etc., thermodynamic efficiency usually refers to the power-producing cycle, and plant efficiency takes into account peripheral items, such as combustor or other heat source losses and plant transmission losses beyond the immediate power-producing element. In existing state-of-the-art engine systems and power plants, the engine, thermodynamic and plant efficiencies are all in the 25 to 40 percent range mainly because existing engines and other power systems dump 60 to 75 percent of the input heat to a low temperature reservoir, such as a water stream, a cooling tower, or to the atmosphere directly.

The "Carnot Cycle" was first postulated by Sadi Carnot in 1824. Since then, this cycle has been widely used in thermodynamic analysis to determine the maximum possible engine efficiency. Here, the temperature of the input heat is given by TH, and the temperature of the output heat (to the traditional reservoir or sump) is given by TL. The low temperature reservoir, or sump, wastes such a large amount of heat in comparison to other parasitic losses, such as bearing friction and insulation heat leaks, that these later effects are often ignored in deriving the following Carnot equation:

$$\text{Engine efficiency} = 1 - TL/TH \qquad \text{(EQ-1)}$$

By either increasing the TH or lowering the TL, the cycle efficiency is increased. For many decades now, researchers have attempted to increase TH by adding a topping cycle, and others have attempted to decrease TL by adding a bottoming cycle.

A conventional Rankine thermodynamic system 20 (FIG. 1) includes a working fluid, such as a liquid 22, that is used at the starting point in the cycle, namely, at circled point #1. This may be at ambient conditions, but can be at conditions quite different than 1.0 atm. and 27.0 degrees centigrade. A fluid pump, such as a high pressure liquid pump 24, is then used to raise the working fluid to the desired pressure at #2. The corresponding temperature versus entropy diagram is shown in FIG. 2. Circled numbers on FIG. 2 correspond to the same circled numbers on FIG. 1. As can be seen in FIG. 2, the temperature rise across the liquid pump may be quite small. The first parcel of heat is added between points #2 and #3 in a thermal input, such as boiler 26 of FIG. 1, which represents the saturated liquid and wet region of FIG. 2. Between points #3 and #4 of both FIG. 1 and FIG. 2, the highest temperature heat is added in the super heater. Two and even three super heaters can be added to a thermodynamic system depending on the working fluid chosen and the temperature range of operation.

From points #4 and #5 on FIG. 1 and FIG. 2, a near-isentropic expansion device, such as a turbine 30, or set of cascaded turbines, or nozzle jet, or the like, produce power. Usually, the small amount of power required by the liquid pump is delivered from the power turbine. The fluid flow of the conventional Rankine thermodynamic cycle is now returned to the liquid pump, thus closing this flow loop by cooling it with a condenser 34 that exchanges heat either with water or air in contact with the ambient. This occurs between points #5 and #1, as shown on both FIG. 1 and FIG. 2. However, the thermal loop remains wide open with approximately two-thirds of the input heat being wasted between points #5 and #1.

SUMMARY OF THE INVENTION

The present invention relates to greatly improving the thermodynamic efficiency of a number of engines, power plants, and other thermodynamic systems. Efficiencies of greater than 50 percent up to approximately 85 or 90 percent may be achieved. This is accomplished by the addition of a heat pump cycle that pumps at least a portion of the traditionally large amount of waste heat back to another portion of the cycle, such as to a low or intermediate temperature level in the power cycle, instead of dumping this heat to a reservoir or sump. Hence, instead of wasting up to two-thirds of the input heat, most of it ends up being recycled.

A thermodynamic system and method of producing useful work, according to an aspect of the invention, includes providing a working fluid and a fluid pump for pumping the working fluid through a cycle. A thermal input is provided for supplying heat to the working fluid. An expansion device downstream of the thermal input converts motion of the working fluid to useful work. A heat pump is provided. The heat pump pumps heat from one portion of the working fluid to another portion of the working fluid.

The heat pump may pump heat from a minimum temperature point of the working fluid, such as from a portion of the working fluid downstream of the expansion device. The cycle may define a heat sump and the heat pump pumping heat from the heat sump to a higher temperature point in the cycle. The system may have an energy efficiency of at least 50 per centum up to 85 per centum and even 95 per centum.

The working fluid may be air, water, ammonia, carbon dioxide, isobutene methane, ethane, Flourinal-85, ammonia-water, Flourinal-water, helium, hydrogen, nitrogen, argon, neon, xenon and krypton. The heat pump may utilize a different working fluid, such as an HFC compound, ammonia, propane, propylene, butane, isobutene and ethane. The heat pump may utilize a working fluid that is common with the system working fluid. The expansion device may be a turbine and the thermal input may be a boiler with the heat pump pumping heat at or near the boiler.

The heat pump may be made up of an evaporator and a condenser with the evaporator receiving heat from the one portion of the working fluid and a condenser delivering heat to the other portion of the working fluid, such as at or near the boiler. The thermal input may further include a super heater and the heat pump may include another condenser delivering heat at or near the super heater.

The thermal input may be an ambient substance at approximately earth ambient temperature. The heat pump may include an evaporator and a condenser, the evaporator receiving heat at the one portion of the working fluid and the condenser delivering heat at or near the thermal input. The system may further include a starting device for starting flow of the working fluid. The ambient substance may be surface water, a geothermal source and/or the earth surface. The one portion of the working fluid is below earth ambient temperature.

The system may be an air-breathing engine having a fuel combustor and fuel and air intakes to the combustor. The air-breathing engine may be a jet engine having a nozzle connected with the fuel combustor and the thermal input may remove heat from the nozzle. The heat pump may include a turbine which drives an air compressor supplying air to the fuel combustor. The air may be compressed to a liquid state prior to being supplied to the fuel combustor. The system may be a bottoming cycle for improving efficiency of the engine with the thermal input receiving waste heat produced by the engine. The heat pump may include an evaporator and condenser. The evaporator receives heat at one portion of the working fluid and the condenser delivers heat at or near the thermal input. The working fluid may include a liquid and a heat exchanger between the working fluid and the evaporator in another heat exchanger between the working fluid and the condenser. The air-breathing engine may be a vehicle engine, such as an aircraft engine or a land-based vehicle engine.

The system may be an end-use fluid-cooled system. Such system may be used to generate cryogenic fluids. The system may cool air as an end-use fluid. The thermal input may be receiving heat extracted from the end-use fluid. The heat pump may include an evaporator and a condenser, with the evaporator receiving heat from the one portion of the working fluid and the condenser discharging heat at or near the thermal input. The system may include a starting device for starting flow of the working fluid. The one portion of the working fluid may be below the temperature of the end-use fluid. The working fluid and the heat pump may have a common thermal ground.

The heat pump may be a classic vapor compression heat pump, a synthesized multi-state heat pump, a Brayton heat pump, an absorption heat pump, or a heat pipe. The heat pump may include a compressor with the system being thermally balanced by adjusting compressor speed and/or pump speed. The one portion of the working fluid may be a thermal sump.

A passive regenerator, or recuperator, may be used to transfer heat from a third portion of the working fluid to a fourth portion of the working fluid. The fourth portion of the working fluid may be downstream of the third portion of the working fluid with respect to flow of the working fluid and the another portion of the working fluid being upstream of the fourth portion of the working fluid with respect to the flow of the working fluid. The regenerator may have a pinch point with respect to the flow the working fluid. The portion of the working fluid may be downstream of the pinch point of the regenerator.

The heat pump may utilize the working fluid of the system as the working fluid of the heat pump. The heat pump may include a series connection downstream of the fluid pump in the direction of the flow of the working fluid. The series connection may include an expansion valve and a turbine downstream of the expansion valve in the direction of the flow of the working fluid. The series connection may include a first transfer coil upstream of an expansion valve in the direction of the flow of the working fluid and a second heat transfer coil downstream of the turbine in the direction of the flow of the working fluid, wherein the first and heat transfer coils are in transfer relationship.

Another type of Rankine (liquid compression) heat-pump/power system using a single working fluid may also be used. Two heat-pumped variations of a Brayton cycle (gaseous compression) may also be used. A variation of a Diesel (or Spark Ignition) engine with a single heat-pump per engine cylinder may also be used.

An efficiency enhancing subsystem for enhancing efficiency of an energy recovery system having a working fluid, a thermal input for supplying heat to the working fluid and an expansion device downstream of the thermal input for converting motion of the working fluid to useful work, according to another aspect of the invention, includes a heat pump. The heat pump pumps heat from one portion of the working fluid to another portion of the working fluid and compresses the working fluid.

The heat pump may include a vapor compressor compressing the working fluid from a vapor state to a liquid state and an expansion valve downstream of the compressor. The heat pump may further include a liquid pump downstream of the expansion valve for compressing the liquid working fluid.

These and other objects, advantages, and features of this invention will become apparent upon review of the following specification in conjunction with the drawings.

BRIEF DESCRIPTION OF THE DRAWINGS

FIGS. 19a through 19c are block diagrams used to illustrate that a continuous flow reservoir with a temperature gradient is capable of powering a heat engine;

FIGS. 20a and 20b compare a very efficient electrical circuit to a very efficient heat-pumped block diagram of a thermodynamic system;

FIG. 21 is a temperature versus entropy diagram for the compression and heat-pumping subsystem of a power system employing a single fluid for all operations;

DESCRIPTION OF THE PREFERRED EMBODIMENT

Figure 1:
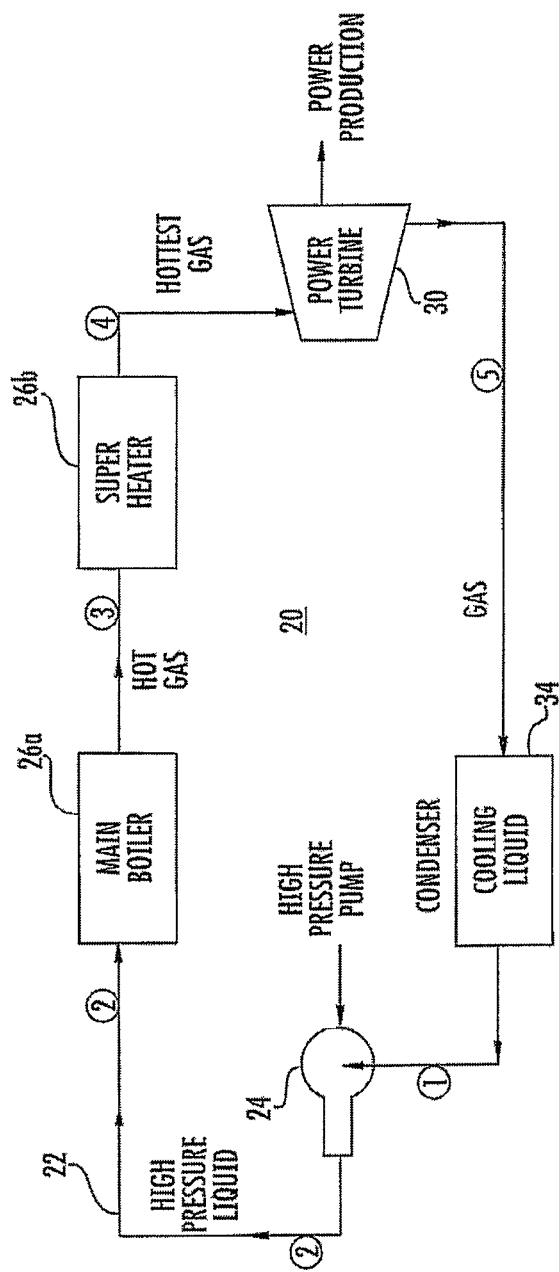
FIG. 1 is a diagram of the known Rankine power cycle for producing useful work.
Figure 2:
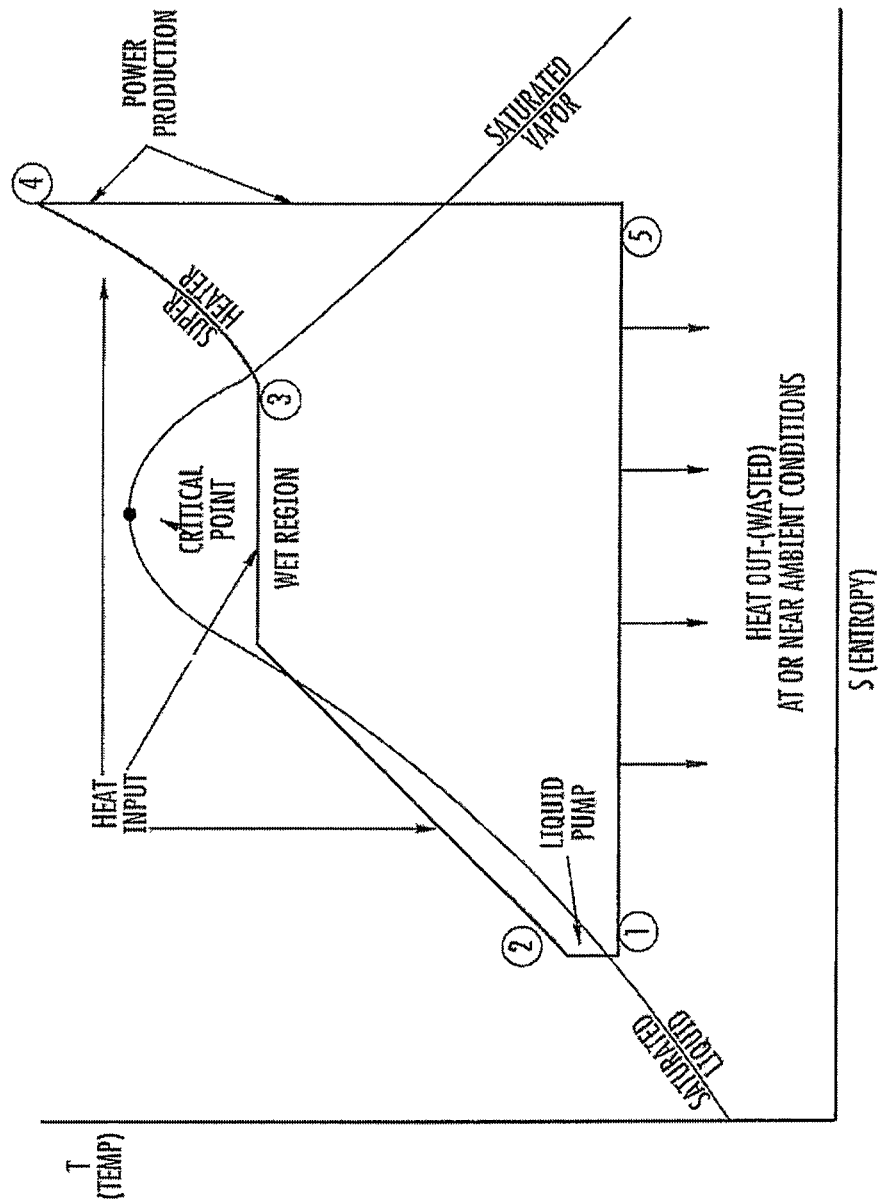
FIG. 2 is a temperature versus entropy diagram for the power cycle illustrated in FIG. 1.
Figure 3:
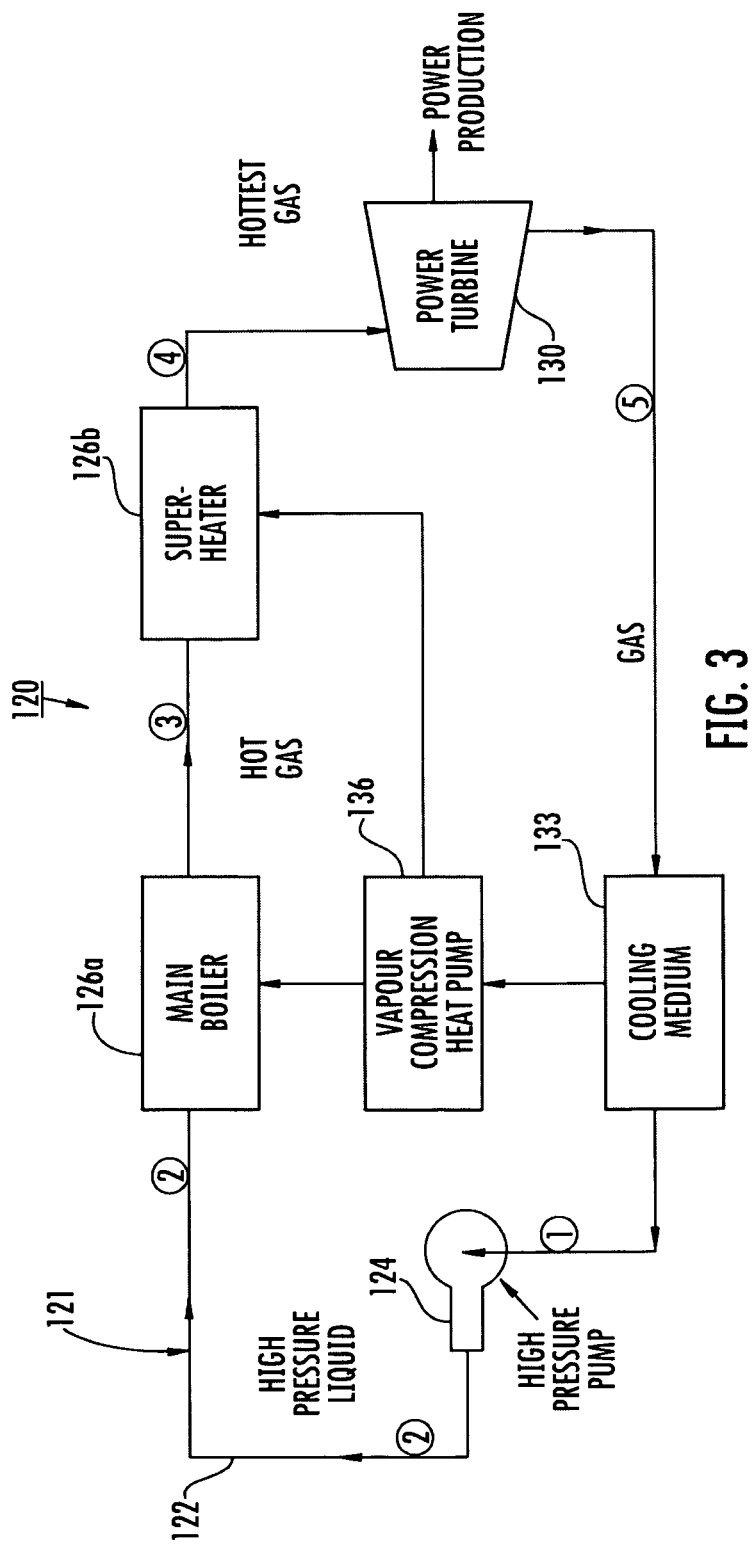
FIG. 3 is a block diagram of a thermodynamic system according to an embodiment of the invention.
Figure 4:
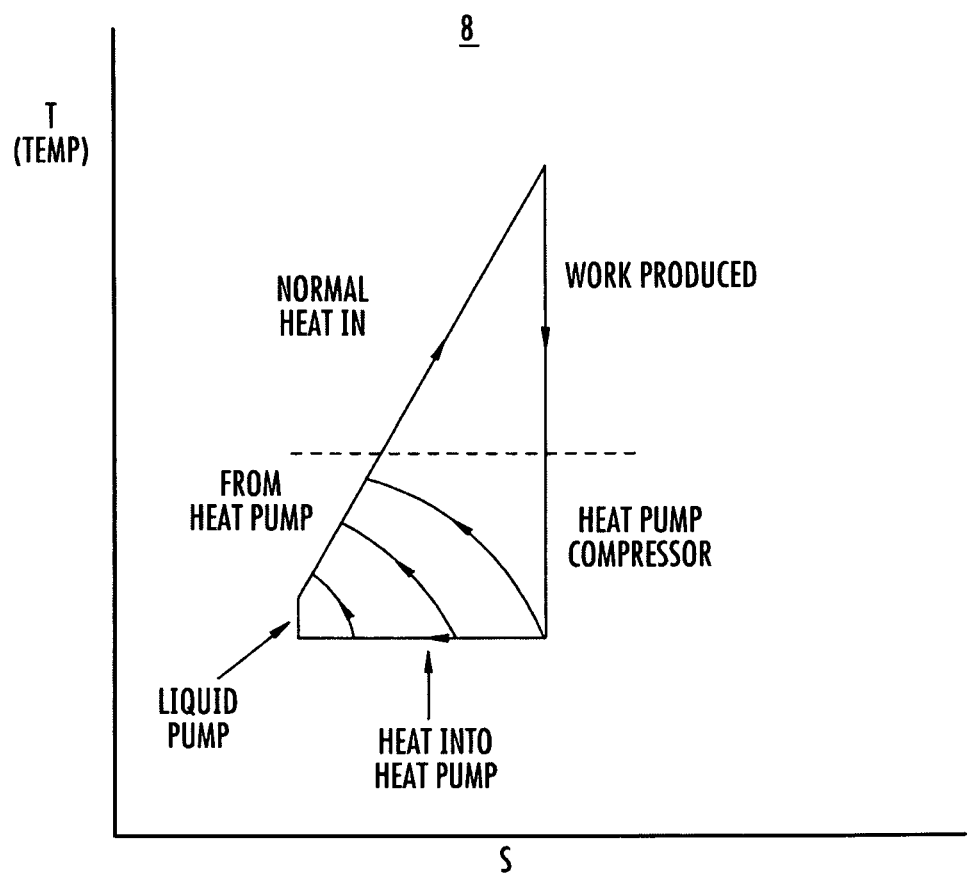
FIG. 4 is a diagram of the thermodynamic system in FIG. 3.

Referring now to the drawings and the illustrative embodiments depicted therein, the preferred embodiment utilizes a modified Carnot cycle (FIGS. 3 and 4). Compression is illustrated as kept to a minimum so as to minimize both the compression power and the temperature differential across the compression. This results in the sloping heat input part of the cycle. The vertically straight line, nearly an isentropic line, represents the work produced, such as through an expansion device. The bottom horizontal line represents the large heat rejection of the power cycle, which does not need to be discharged to an external heat reservoir or sump. At least a portion of the rejection heat is pumped over to the slanted heat input line, such as by a heat pump as illustrated in FIG. 4.

The basic cycle employs a heat pump 136 to transfer heat from one portion, such as the low temperature side of an engine, or other thermodynamic system, to another portion, such as the high temperature side (FIG. 3). In certain embodiments, neither side of the pump is affixed to the ambient. Rather than dump, and, hence, waste, this enormous amount of heat, the heat pump takes the heat that previously was discharged to an external reservoir and pumps it back to another part of the heat input side of the power cycle. The thermal gradient of the system is established by the temperature gradient that the heat source imparts on the working fluid as it passes from the lowest temperature part of the heat source, for example, 800 degrees Kelvin to a higher temperature part of the heat source, for example, 1500 degrees Kelvin.

In configuring the thermodynamic cycles embodied herein, extensive use of conventional liquid pumps, near-isentropic-multistage-compressors, isothermal multistage compressors, various types of heat exchangers, and regenerators may be used. A wide variety of working fluids can be used in the power cycle and a wide variety of refrigerants in the heat pump itself. In addition to incorporating heat pumps into engines and power plants, improving the thermodynamic efficiency of air conditioners, refrigerators, and air separation (oxygen) plants can also be accomplished with these thermodynamic systems. Thermodynamic efficiencies from greater than 50 percent into the high 80 or low 90 percent range are possible with the elimination of the traditional large-heat-wasting external reservoir or sump. Parasitic-losses, such as bearing friction, combustor losses, and heat leaks remain.

The power input side (sloped side) of the power cycle of FIG. 4 may be modified to accommodate all of the pumped heat plus a very substantial exterior heat input. Method 8 provides a new thermodynamic cycle coupled to traditional power and refrigeration cycles and has numerous practical applications:

1. Automobile Engines—all new gas turbine cycles, either air-breathing or closed fluid cycles, and "bottoming-cycles" fitted to existing engines.

2. Diesel Engines—all new gas turbine cycles, either air-breathing or closed fluid cycles, and "bottoming-cycles" fitted to existing engines.

3. Electric Generating Power Plants—fueled by coal, nuclear sources, natural gas, and geothermal—could be all new gas turbine cycles with heat pumps, as well as "bottoming cycles" replacing existing reservoirs, such as cooling towers, cooling ponds, and rivers.

4. New Power Plants Operating Solely on Ground Heat, Water Pond Heat, or Flowing Water Heat—Since near isentropic power turbine establishes the power system thermal gradient and not a system of reservoirs, ambient conditions can establish the high temperature point of the system, and power-producing turbine establishes the low temperature point.

5. Aircraft Jet Engines—both open cycle with heat pump and closed cycle using traditional refrigerants in the power cycle.

6. Air Conditioners.

7. Refrigerators.

8. Air Separation (Oxygen Producing) Plants.

A thermodynamic system 120, as shown in FIG. 3, includes a power cycle having a working fluid 122 that cycles through a thermal input in the form of a main boiler 126a and a super-heater 126b. The heated fluid is supplied to an expansion device, such as a turbine 130, which may drive a generator (not shown). A heat exchanger 133 supplies heat from the working fluid to a heat pump 136 that takes substantially all of the heat from the working fluid 122 and pumps it back at or just upstream of the main boiler 126a and super-heater 126b. For the lower pressure Rankine systems shown in FIG. 3, the boiler and super heater are separate. In higher pressure systems, the boiler and super heater may be more of a continuum, and, hence, the heat is pumped to this single continuum. System 120 may be applied, for example, to electrical energy generation, such as from fossil fuels (oil, coal or gas) or from nuclear fuel. It may also be applied to a range of industrial processes.

Figure 5:
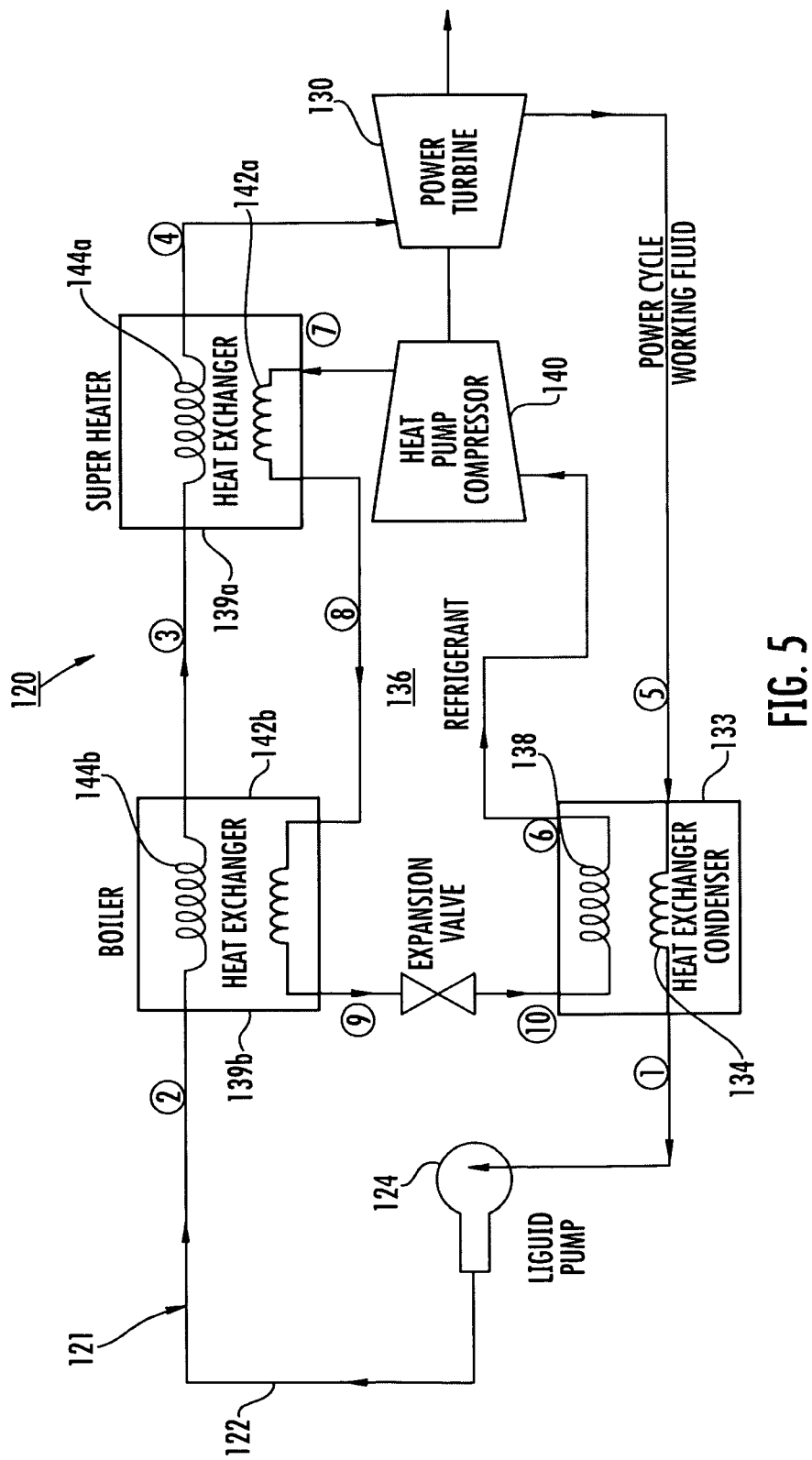
FIG. 5 is a more detailed block diagram of the embodiment of the thermodynamic system illustrated in FIG. 3.

FIG. 5 shows thermodynamic system 120 in greater detail. In power loop or cycle 121, heat exchanger 133 includes a condenser coil 134 that removes heat from the working fluid and may condense the working fluid, for example, from steam to water. Heat pump 136 includes an evaporator 138 in the form of second heat exchanger coil 138 in heat exchanger 134. The evaporator 138 draws the heat off by boiling the heat pump refrigerant. The vapor from the evaporator is compressed by a vapor heat pump compressor 140 so as to elevate the refrigerant temperature high enough to transfer heat via a heat exchanger 139 including a heat pump condenser in the form of a heat transfer coil 142a to a heat exchanger coil 144a of the power system working fluid in the super heater. This process is repeated with heat between the heat pump being transferred via a heat exchanger 139b including a heat pump condenser in the form of a heat transfer coil 142b to a heat exchanger coil 144b in the power system working fluid in the boiler. The boiler and super heater are shown here schematically as boxes, much like a combustion furnace. It should be understood that, for some heat sources, it would be more appropriate to show a third heat transfer coil in each the boiler and the super heater. In the illustrated embodiment, heat pump 136 converts low grade heat, such as, for example, at a temperature of approximately 400 degrees Fahrenheit to a high grade heat, such as at a temperature, for example, of approximately 1000 degrees Fahrenheit.

A wide range of power system working fluids is feasible depending on the application and the temperature range. Near ambient, ammonia, carbon dioxide, isobutene, methane, ethane, Flourinal-85 and various binary working fluids, such as ammonia-water and Flourinal-water, may be used. For cryogenic applications, liquids, such as those of helium, hydrogen, nitrogen, argon, neon, xenon and krypton may be used.

For refrigerants which make up a working fluid 122 in heat pump 136, a wide range is also possible. Near ambient and environmentally friendly refrigerants, such as the HFC compounds R-134a, R-407c, and R-410a, may be used. More traditional fluids, such as ammonia, propane, propylene, and blends of propane, butane, isobutene and ethane, may also be used.

Figure 6B:
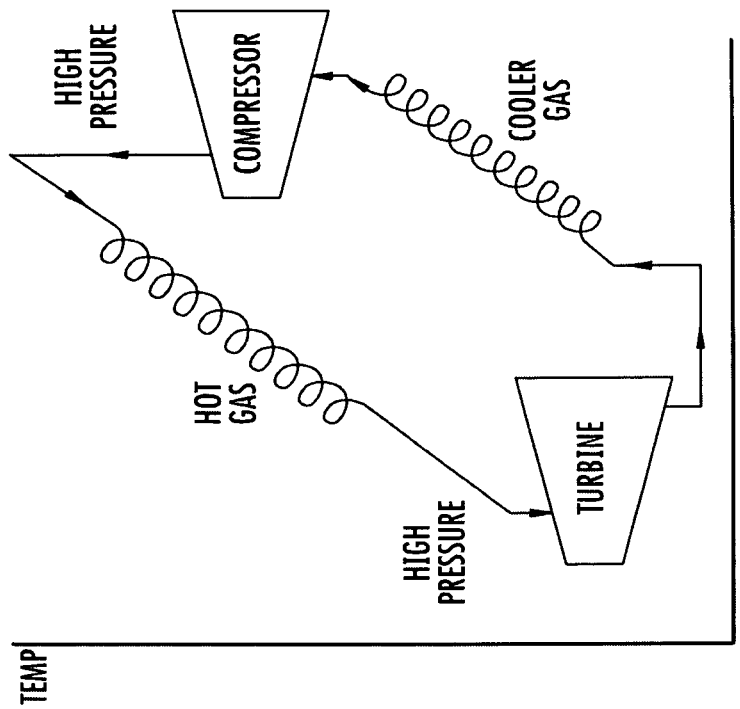
FIG. 6b is the same view as FIG. 6a of another heat pump cycle that is useful with the invention.
Figure 6A:
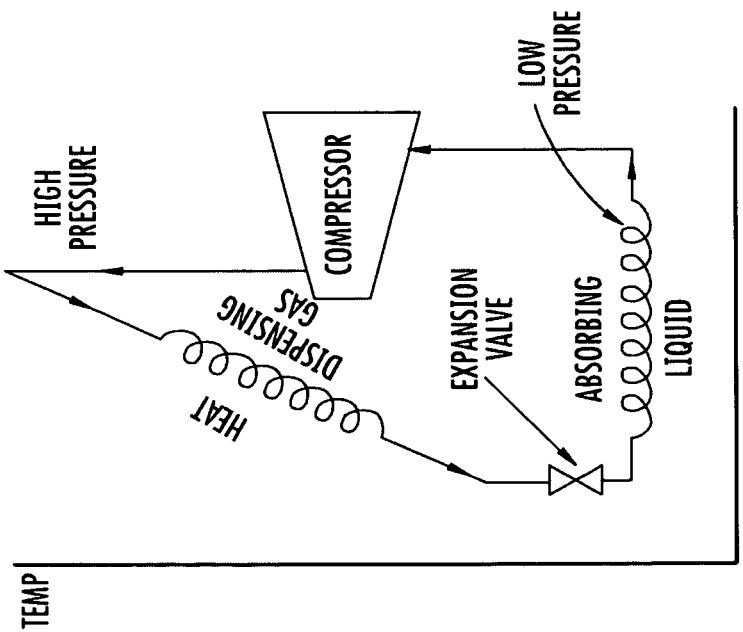
FIG. 6a is a diagram of a heat pump cycle that is useful with the invention.

Examples of heat pump cycles that can be used include a classical vapor compression heat pump, as illustrated in FIG. 6a. However, other cycles may be used, such as the Brayton cycle heat pump in which the cool side gas is compressed by a near-isentropic compression to elevate the stream temperature high enough to dump waste heat back into the power loop. A turbine expander then drops the stream temperature to its lowest point to facilitate extracting the waste heat from the power cycle. This cycle is shown in FIG. 6b, and it can be matched readily to a Brayton power cycle.

Other heat pump cycles can also be used, such as an absorption heat pump, various heat transformers, heat pipes, and the like.

In some instances, the same working fluid is used in both the power system and the heat pump, as will be described in more detail below. In such cases, the power system may be operated at a much higher base pressure than the heat pump.

In order to determine efficiency of system 120, both the power system and the heat pump cycle may be viewed as power cycles and their individual energy efficiencies combined. The power cycle 121 may be around 50 percent and the heat pump cycle around 25 percent, by way of example.

Thermodynamic cycle 120 may be analogized to an electric circuit. All pipe runs and components should be well insulated to keep outside heat out from cold running components and to prevent heat leaks to the outside ambient from hot running components. Like electrical circuits, each power cycle may be grounded at one point. For thermodynamic systems 120, a point in the cycle between the liquid pump inlet and the cooling medium may be the ground point. The heat pump loop may be thermally tied to the power system loop at one point.

Figure 7:
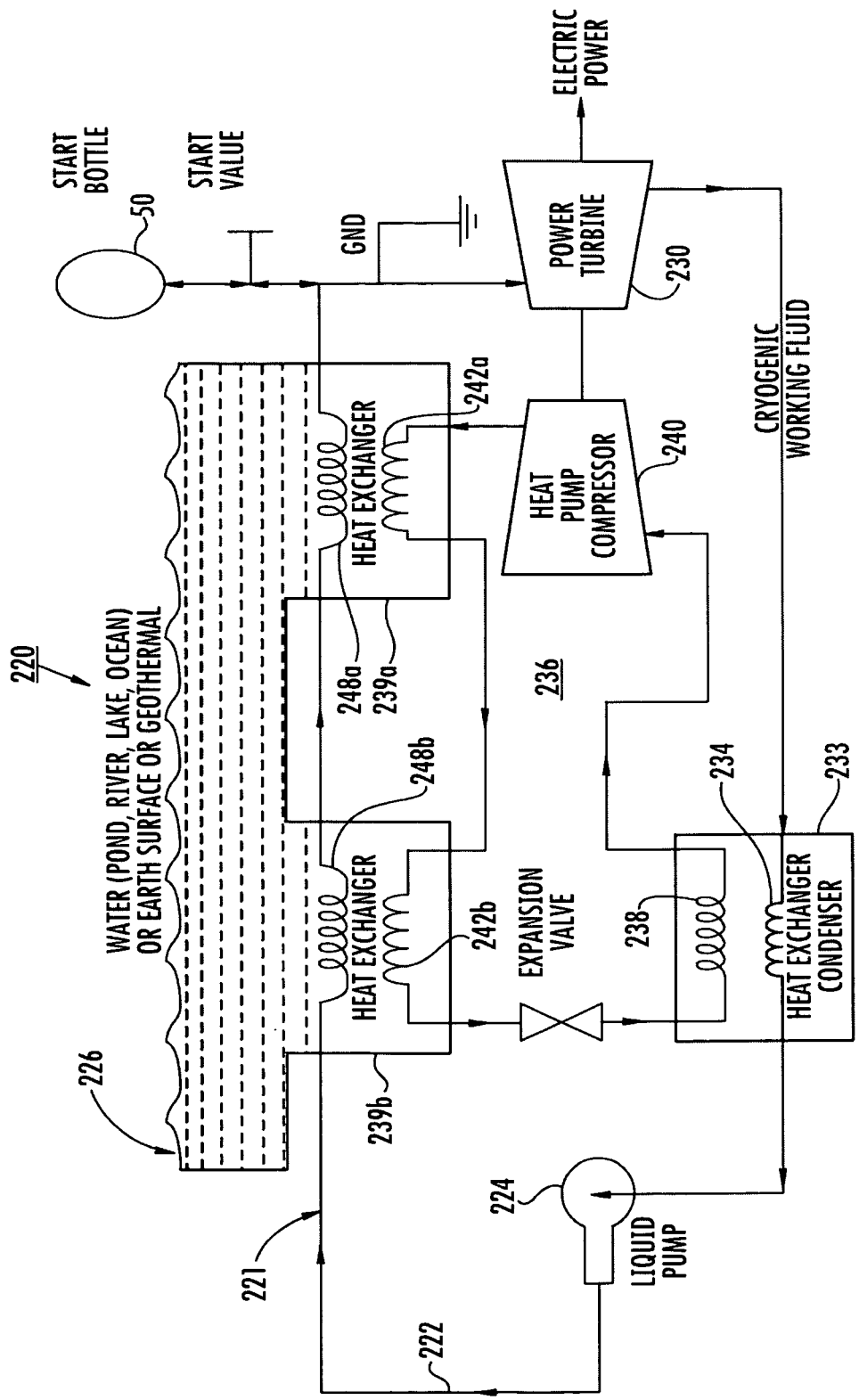
FIG. 7 is a block diagram of a thermodynamic system according to yet another embodiment of the invention.

In an alternative embodiment, a thermodynamic system 220 includes a power cycle 221 having a thermal input 226 in the form of water (pond, creek, river, lake, or ocean) or earth surface or geothermal heat sources (FIG. 7). Thermal input 226 in the form of the water or earth surface is in direct contact with heat input coils 248a and 248b. A greater or lesser number of coils may be used. To start the system, a starting device, such as a high pressure "start bottle" 50 is opened, which starts the turbine 230 rolling. It, in turn, starts the heat pump compressor 240, which is coupled to the turbine and liquid pump 224, which is also driven by the turbine. As the working fluid goes through the turbine, both temperature and pressure are greatly lowered, establishing a bottom temperature lower than ambient. The working fluid is then condensed to a liquid in a heat exchanger 233 formed by condenser coil 234 in the power cycle and evaporator coil 238 in the heat pump cycle and is pumped back up to high pressure by a liquid pump 224 as it enters heat exchangers 239a and 239b that include heat input coils 248a and 248b in intimate contact with the earth surface or water.

Figure 8:
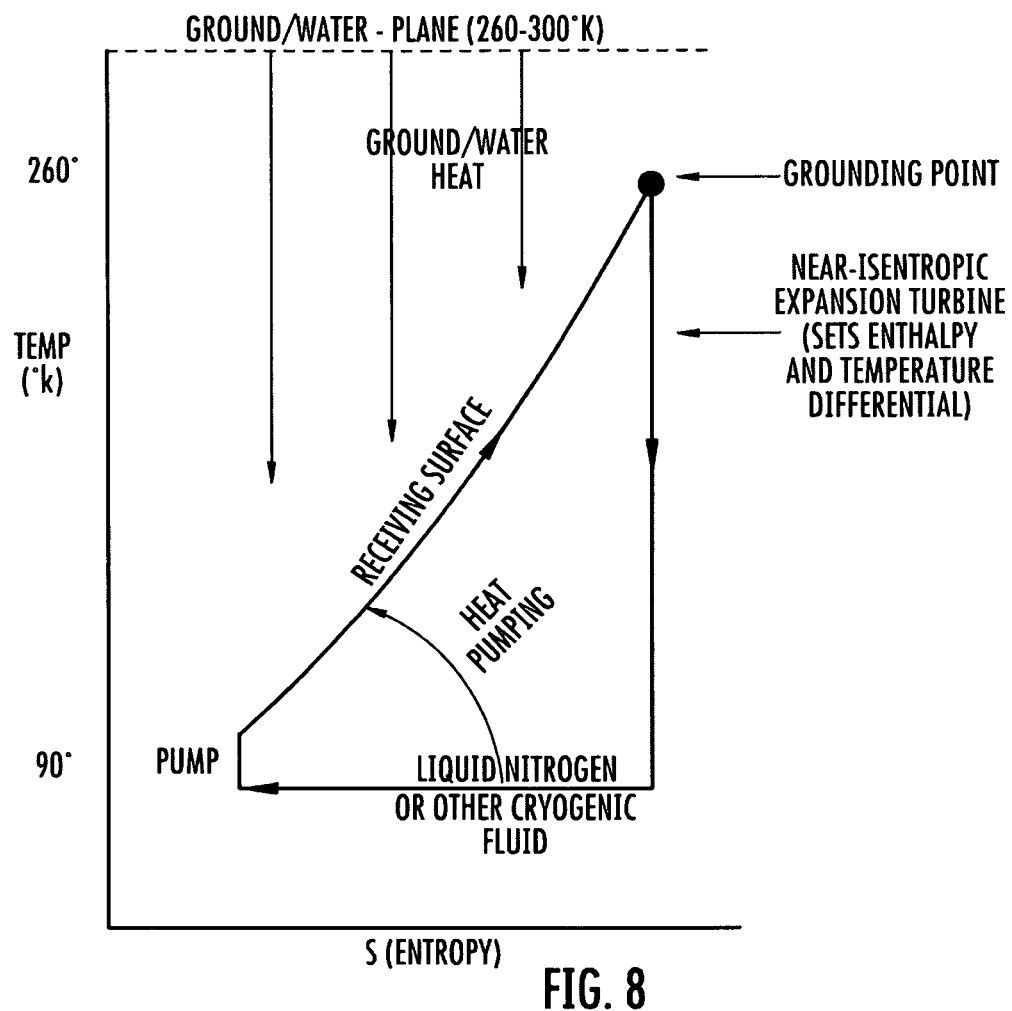
FIG. 8 is a temperature versus entropy diagram for the thermodynamic system illustrated in FIG. 7.

Since the working fluid is at a very low temperature as it enters heat exchanger coils 248a, 248b, it absorbs heat from the earth surface or water. Eventually, the system reaches equilibrium and the turbine, or cascade of turbines, produces power from the earth surface or water. System 220 includes a heat pump 236 having an evaporator coil 238 in heat exchange relationship with condenser coil 234 of the power cycle via a heat exchanger 233 and condenser coils 242a and 242b in heat exchange relationship with respective coils 248a and 248b of thermal input 226. A compressor 240 pumps the refrigerant working fluid to transfer low grade heat from condenser 234 to high grade heat at heat source 226. This adds efficiency to the cycle, as illustrated in FIG. 8. The temperatures of the low and high grade heat will be correspondingly adjusted for the application to temperatures at and below ambient.

The temperature (T) vs. entropy (S) diagram for this is shown in FIG. 8. Liquid nitrogen may be used, by way of example, as the working fluid for system 220. The scale of this type of system may range from a few kilowatts of electrical energy generation for home use to many megawatts of electrical energy generation for industrial plants, utilities, and the like. Smaller units may be near user properties, thus eliminating long transmission lines. One benefit that accrues to system 220 is eliminating waste heat rejection to the ambient. The entire system no longer needs to be thermally grounded at the waste heat reservoir. Hence, it could be grounded at another point, in particular at the inlet to the power turbine. This allows heat to be extracted from either the earth surface or a water source.

Thermodynamic system 220 complies with the second law of thermodynamics. The heat from the earth surface, water, or geothermal sources is heat just as that from combustion sources. These heat sources are just at lower temperatures. If these sources cool, the power production will drop off. The start bottle has stored energy and allows the system to come to a steady state that enables power extraction. Without such a start system, the power system would not be activated.

Figure 9:
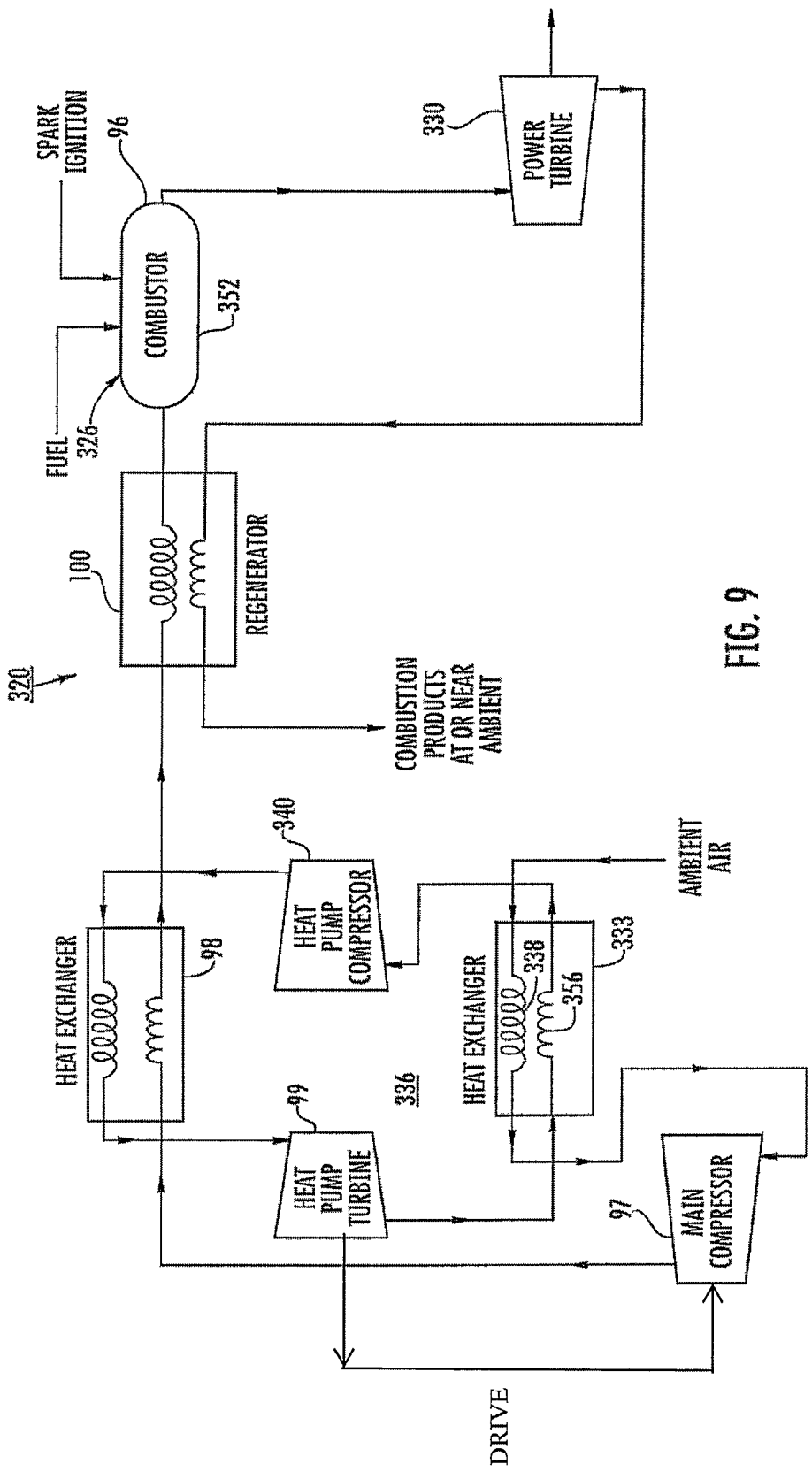
FIG. 9 is a block diagram of a thermodynamic system according to yet another embodiment of the invention.
Figure 10:
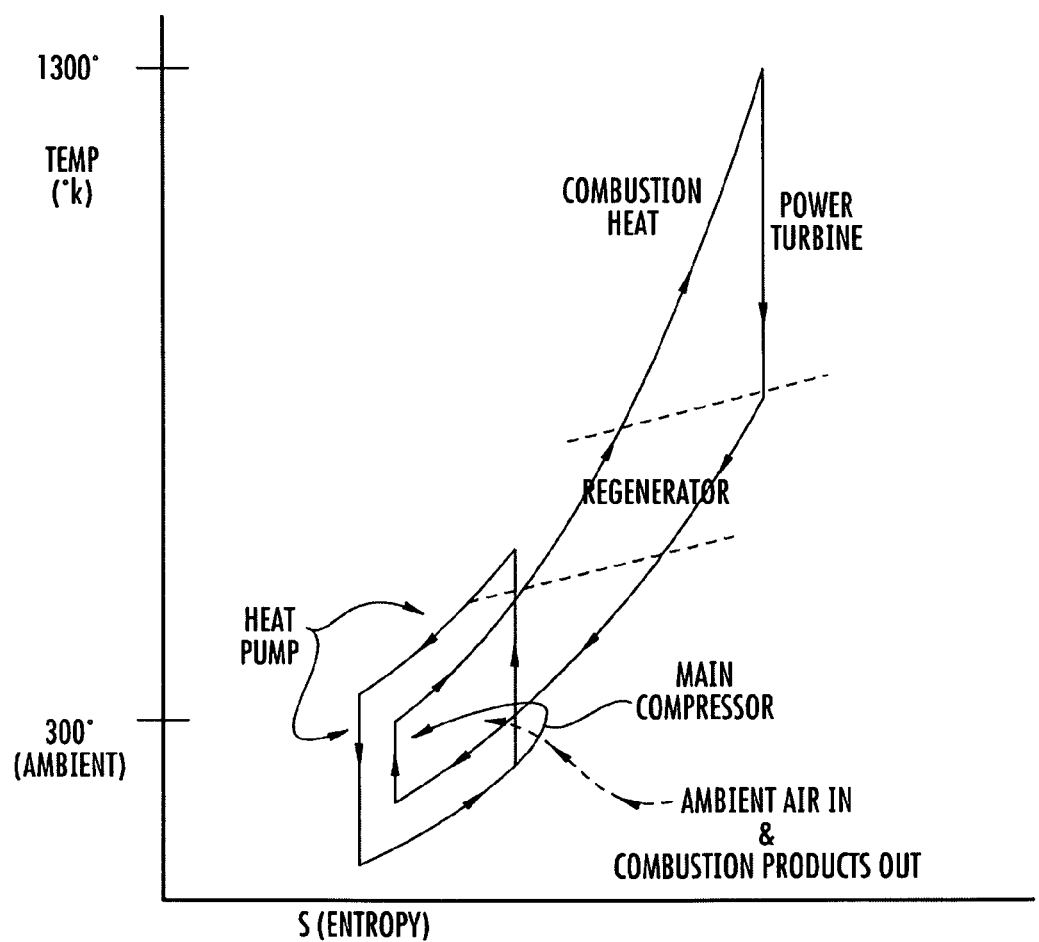
FIG. 10 is a temperature versus entropy diagram for the thermodynamic system illustrated in FIG. 9.

A Brayton (gaseous compression) thermodynamic system 320 that may be useful, for example, with transportation vehicles is embodied in an air-breathing engine 96 having a combustor 352 (FIG. 9). Air-breathing engine 96 does not require the system to carry along an oxidizer, such as used in rockets. System 320 is embodied in a Brayton cycle derivative for heat-pumped air-breathing engines. Traditionally, the Brayton cycle does its compression by isentropic gas compression. Outside ambient air is sucked in by a main compressor 97, passing through a pre-cooler heat-exchanger 333 as it goes. Heat exchanger 333 includes a coil 338 that exchanges heat to a coil 356 that is the bottom, cool side, of a Brayton heat pump 336, previously illustrated in FIG. 6b. Heat pump 336 has a compressor 340 and a turbine 99 in its working fluid. The air exiting the main compressor 97 is then heated by another heat exchanger 98 at the high temperature side of the Brayton heat pump. System 320 is structured to exhaust combustion products at, or near, ambient by the use of a regenerator, or recuperator, 100 that extracts heat from the output of a power turbine 330 and delivers that heat to further heat the air exiting main compressor 97. In FIG. 10, the temperature (T) vs. entropy (S) diagram for this air-breathing system is shown, including the Brayton heat pumped superimposed at the bottom of the diagram. The dashed lines show that both compression and heat pump cooling can be done below ambient in this system since the traditional cooling sump no longer exhausts to ambient, but to the inlet of the heat pump.

Figure 11:
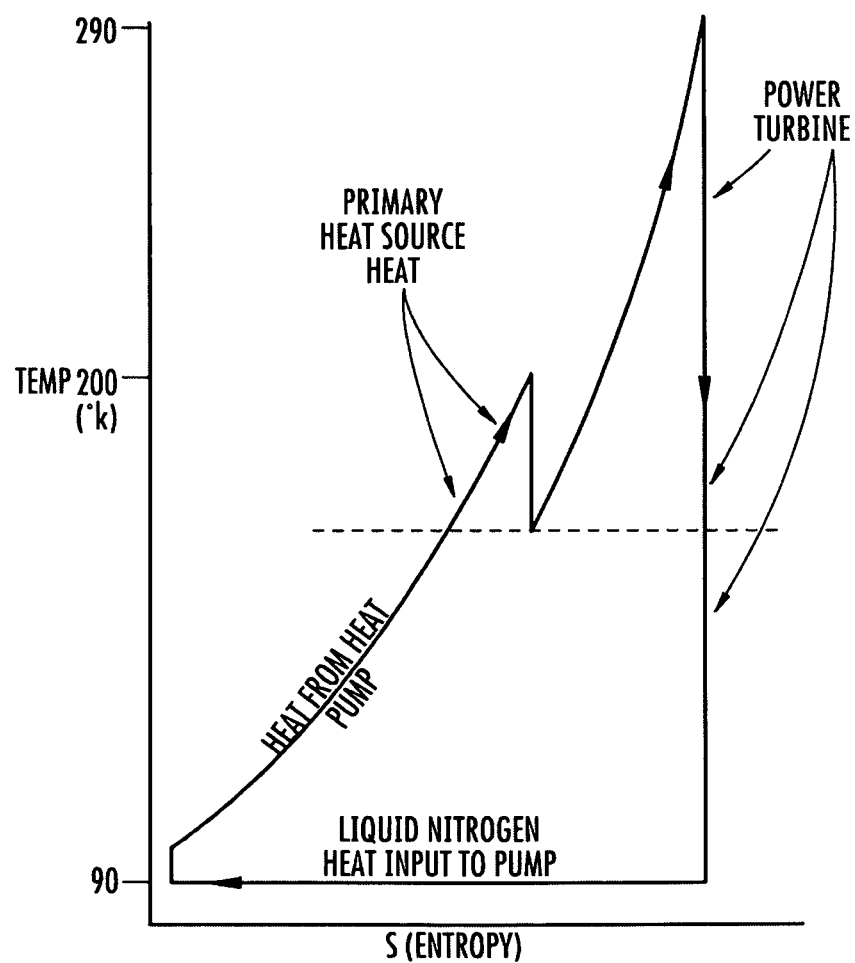
FIG. 11 is the same view as FIG. 10 of an alternative embodiment thereof.

In all systems 120, 220, and 320 described above, much contouring of the power cycle is available to accept the heat being pumped by the heat pump. FIG. 11 shows a "Double Peak Power Cycle" that may be used as an alternative to receive the heat that is pumped by the heat pump. Most of the first rise to the first peak of FIG. 11 is used to absorb the heat pump output. The remaining part of the first rise is used to absorb the primary heat source heat. The small isentropic expansion may be used to create a sufficient heating surface for the second rise to absorb the balance of the desired input heat. Embodiments with as any as three or more peaks are possible.

Figure 12:
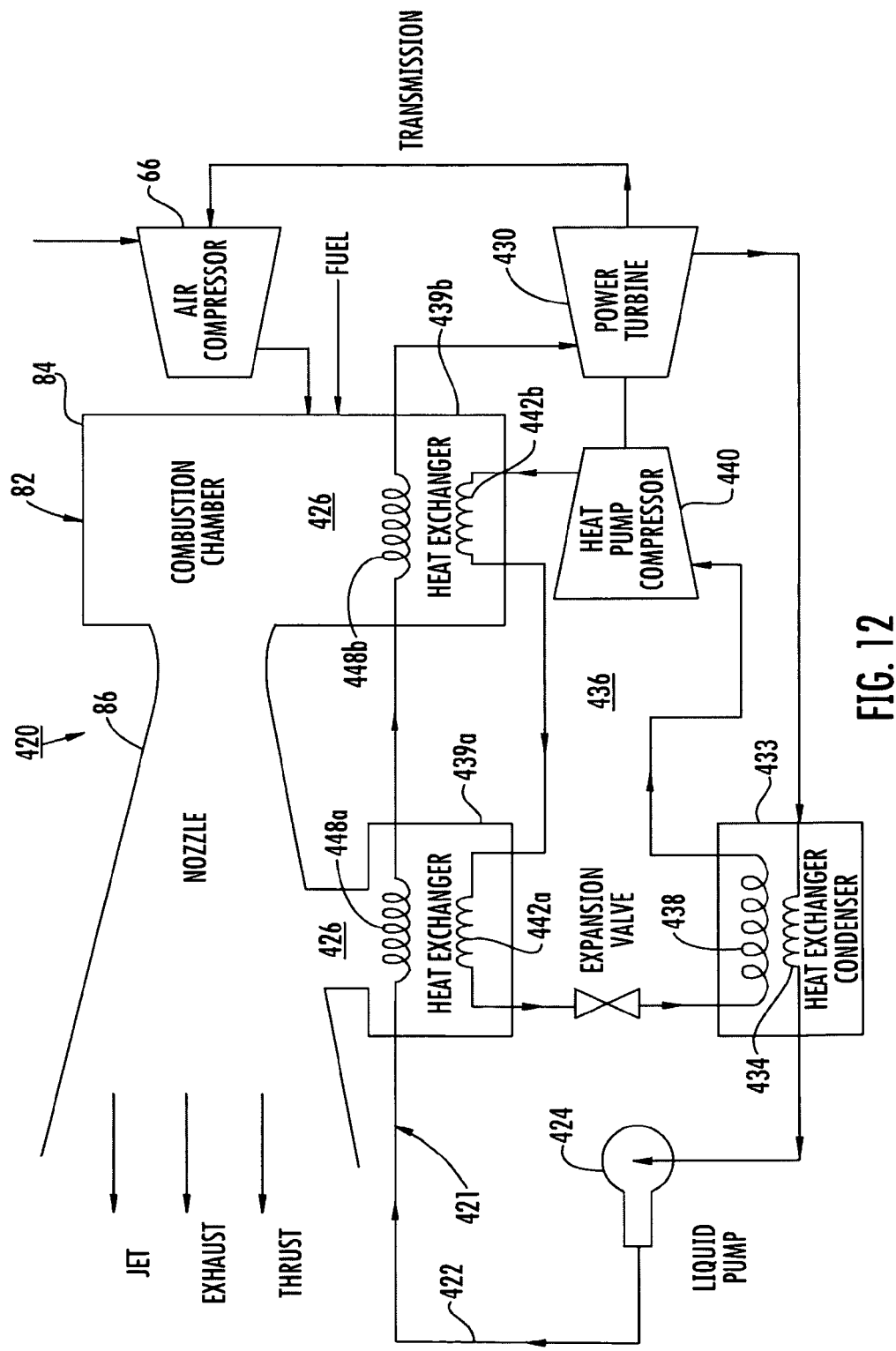
FIG. 12 is a block diagram of a thermodynamic system according to yet another embodiment of the invention.

Another alternative embodiment of a thermodynamic system 420, using a heat pump scheme, is illustrated for an airplane jet engine 82 having a combustion chamber 84 and nozzle 86 (FIG. 12). In this embodiment the heat pump is used only in the powering loop for an air compressor 66. The main thrust is produced by direct combustion of fuel with air. For jet engines presently in use, the power for the compressor 66 is from a high temperature turbine located in the hot engine stream. Here, in FIG. 12, engine wall heat, that acts as a thermal input 426, is received by heat exchanger coils 448a and 448b and used to drive an external power-cycle 421 that enables the whole engine to run much cooler and to bypass larger airflow for environmentally less pollution and more acceptable noise suppression. The power turbine is located out of the hot stream and, hence, should be more reliable. Nozzle wall tube cooling is presently used in rocket engines, but not in present jet engines. A heat exchanger 439a represents a wall cooling system for nozzle 86. System 420 includes a heat exchanger 433 having a condenser 434 that delivers heat from the exhaust of turbine 430 to an evaporator 438 of a heat pump 436. A heat pump compressor 440, mechanically driven from turbine 430, pumps the refrigerant working fluid to deliver heat from heat pump condenser 442a, 442b to thermal input 426 via heat input coils 448a, 448b. The air compressor is shown external to the thrust chamber, but could be integral with the thrust chamber as in present engines.

Figure 13:
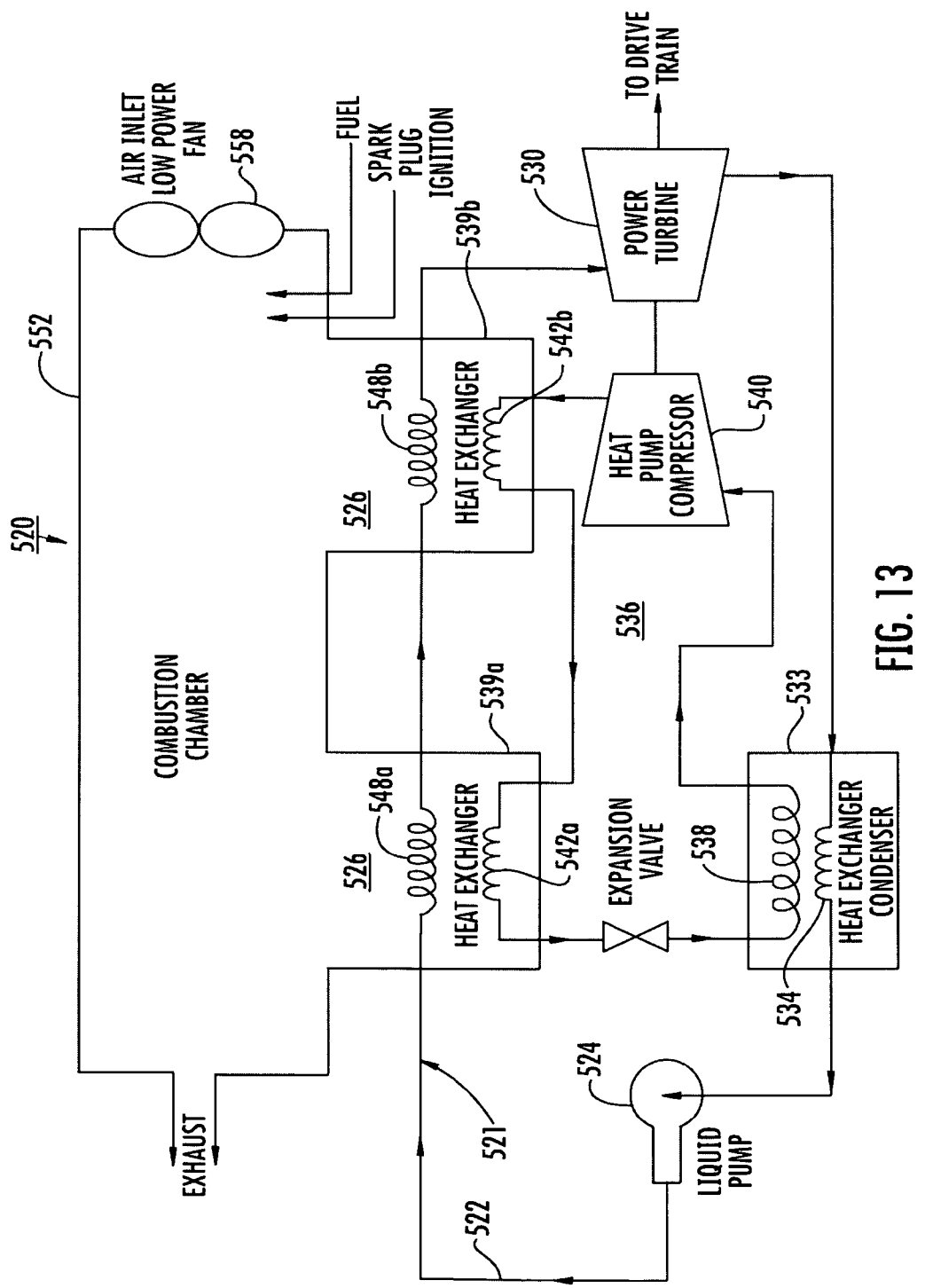
FIG. 13 is a block diagram of a thermodynamic system according to yet another embodiment of the invention.

Another alternative embodiment of a thermodynamic system 520 is embodied in an air-breathing external-combustion engine that may be used for land vehicles, such as automobiles, trucks, and trains, as well as air vehicles, such as fixed and rotary wing airplane and watercrafts, such as boats (FIG. 13). System 520 includes an external combustor, such as a combustion chamber 552. In a moving vehicle, a low power inlet fan 58 may provide sufficient flow to assure uniform combustion and a low pressure to push the exhaust products out the exhaust pipe. The products of combustion provide a thermal input 526 to a power cycle 521 by being in heat exchange contact via heat exchangers 539a and 539b with heat exchanger coils 548a, 548b of the power cycle. Power cycle 521 includes a heat pump 536 that operates in a manner that is in accordance with embodiments previously described.

Figure 14:
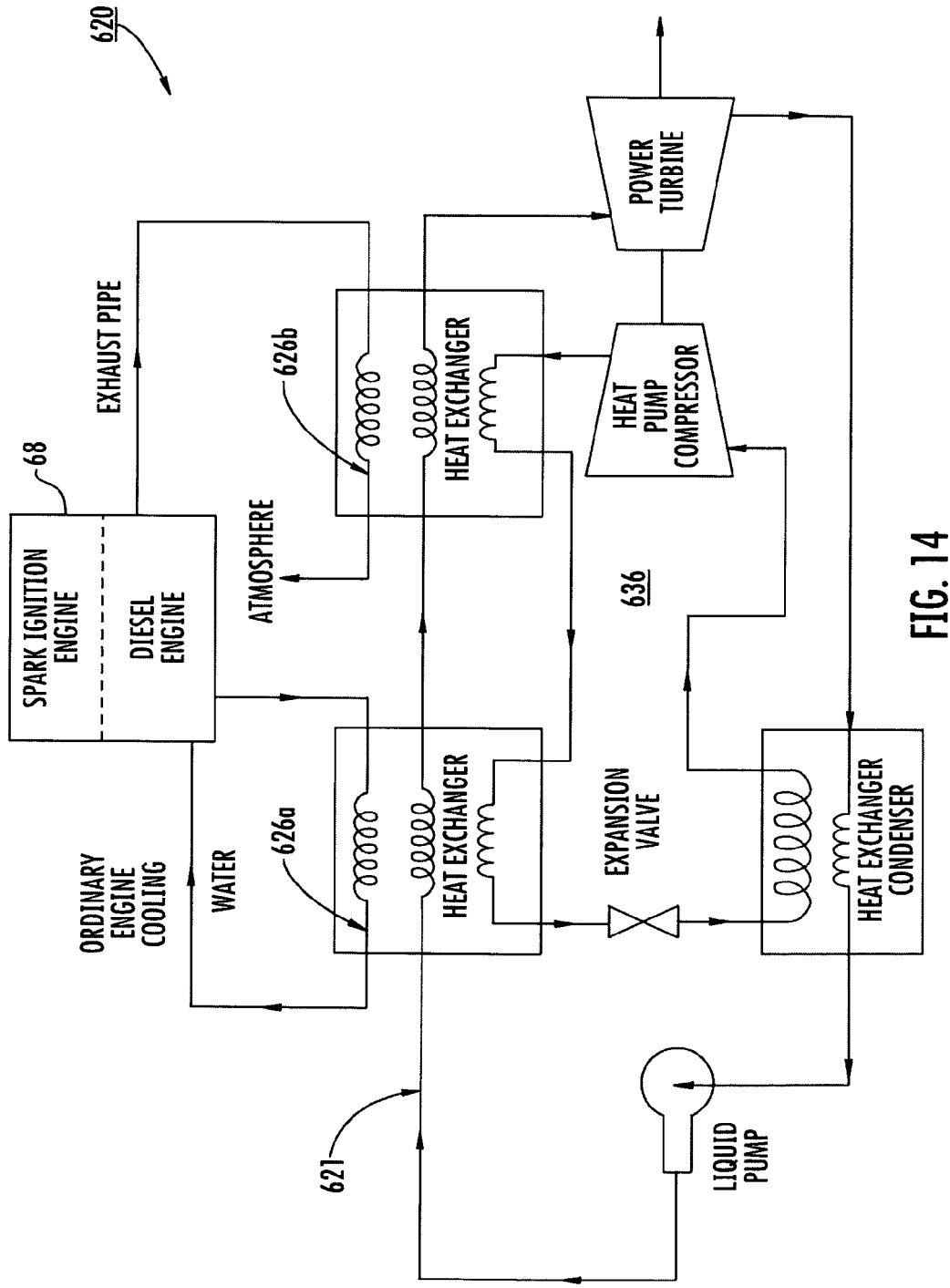
FIG. 14 is a block diagram of a thermodynamic system according to yet another embodiment of the invention.

Another embodiment of a thermodynamic system 620 can be used as an add-on bottoming cycle for an internal combustion engine 68 of existing vehicles and/or vehicle designs, such as auto, truck, train, airplane, and boat engines (FIG. 14). About 40 percent of the heat input to these engines goes out the exhaust pipe, or stack, at temperatures up to 900 degrees Fahrenheit. Another 30 percent goes into the radiator cooling water at about 125 degrees Fahrenheit. System 620 includes a power cycle 621 that receives a thermal input 626a from the engine cooling loop and a thermal input 626b for the exhaust pipe. A power cycle is used in combination with a heat pump 636 in the manner described in previous embodiments. A power system with the double peak arrangement shown in FIG. 11 could convert this 70 percent of presently wasted heat to an additional 60 percent of shaft power.

Figure 15:
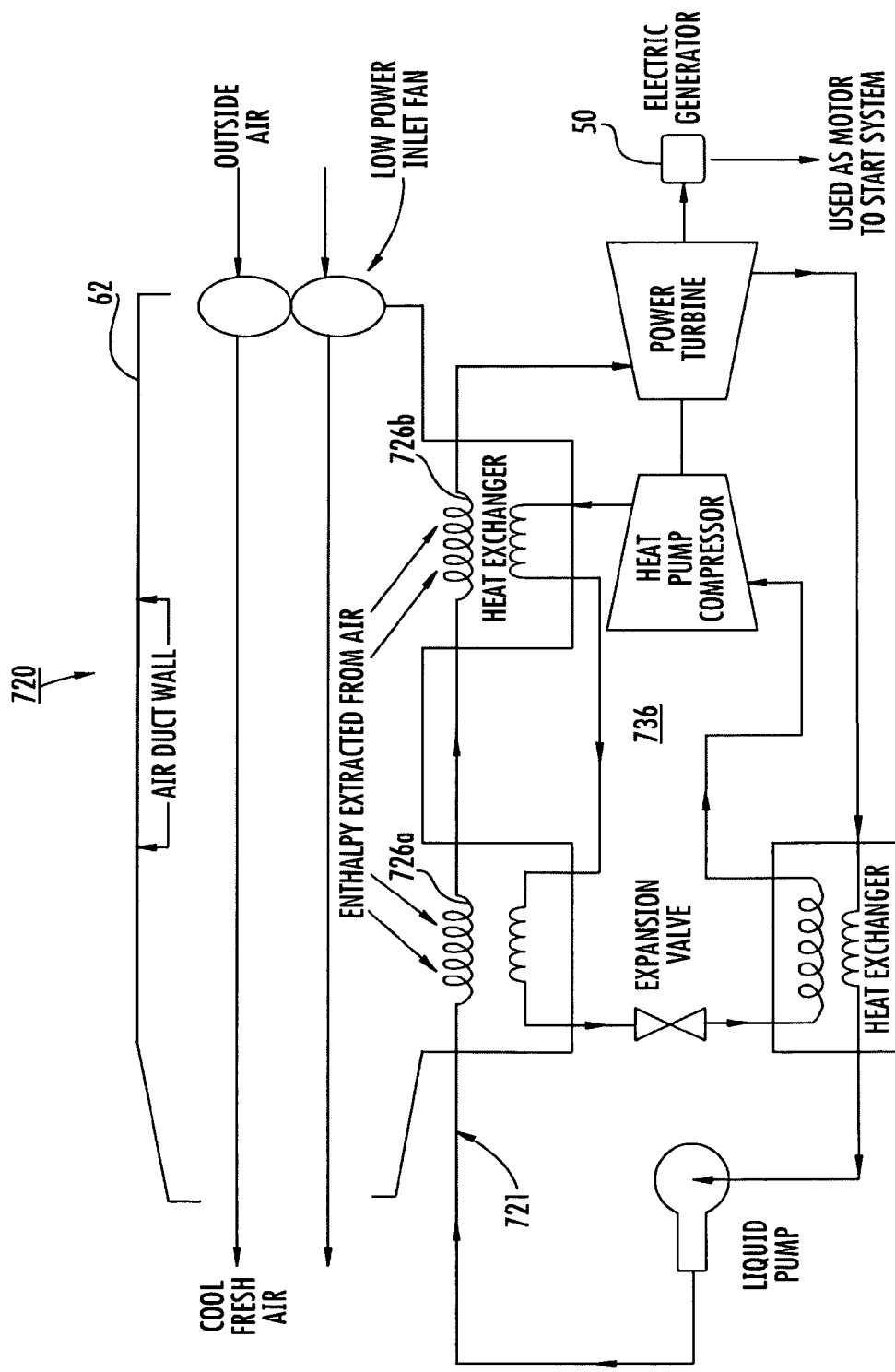
FIG. 15 is a block diagram of a thermodynamic system according to yet another embodiment of the invention.

Another embodiment of a thermodynamic system 720 is used to extract heat (enthalpy) from ambient air, or a lower temperature, flowing through an air duct 62 of an air conditioning system (FIG. 15). System 720 provides for the deletion of an ambient external sump and thereby can be used as an air conditioner. Air conditioners presently consume electric power. This system may produce rather than consume electric power by converting the heat removed from the air, by way of a thermal input 726, to a power cycle 721. A start device, such as a bottle or start electric motor 50, is used to initiate the process as described in previous embodiments. System 720 utilizes a heat pump 736 with power cycle 721 in the manner described with previous embodiments.

Figure 16:
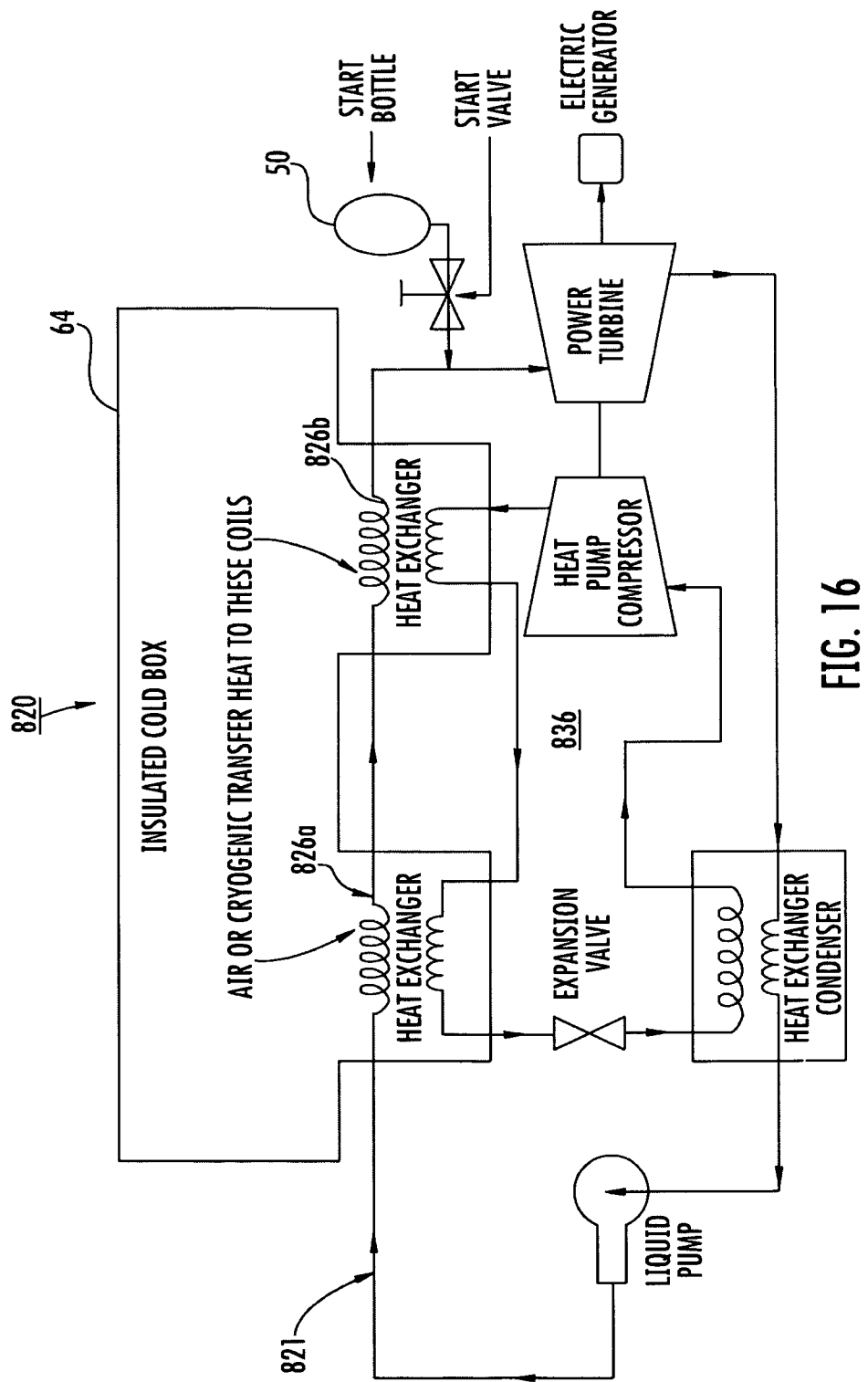
FIG. 16 is a block diagram of a thermodynamic system according to yet another embodiment of the invention.

Another embodiment of a thermodynamic system 820 of FIG. 16 may be used with a refrigerator or Dewar in order to produce cryogenic fluids. System 820 uses an insulated cold box 64 to hold the gas being cooled. As with system 720, thermodynamic system 820 withdraws heat, possibly at very low temperatures that are used to operate a power cycle 821 that incorporates a heat pump 836. Hence, using substances, such as liquid helium, enables the production of cryogenics by extracting heat and producing power.

Figure 17A:
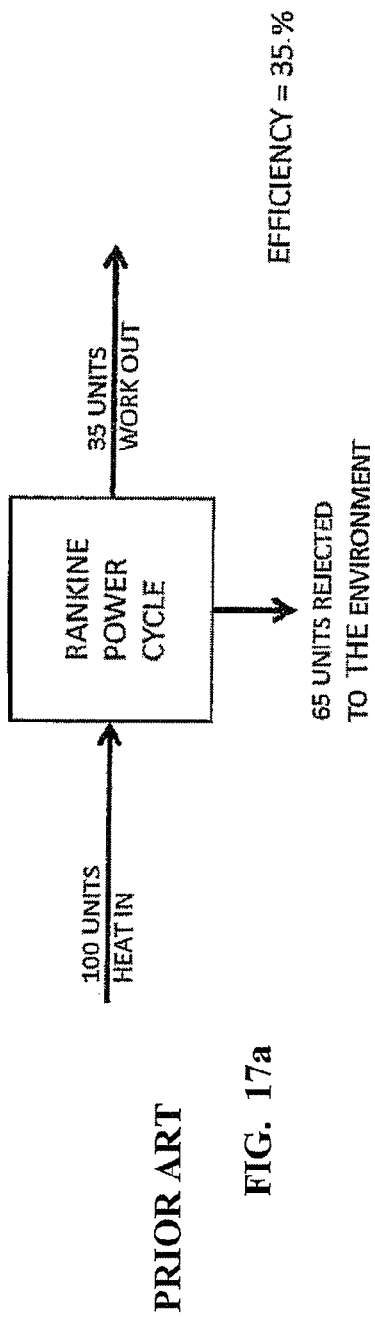
FIGS. 17a and 17b are block diagrams illustrating a comparison of a traditional Rankine cycle with a heat-pumped version.
Figure 17B:
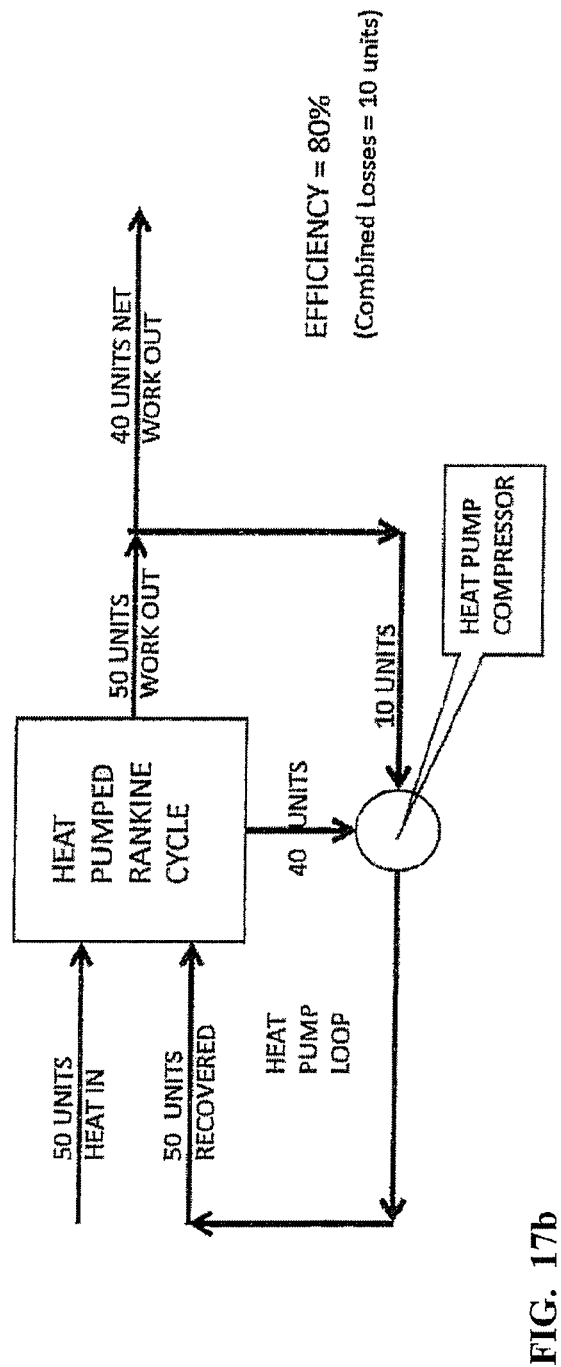

FIGS. 17*a* and 17*b* give a comparison of the heat flow in a conventional Rankine cycle (FIG. 17*a*) versus the heat flow resulting from the addition of a heat pump (FIG. 17*b*). By using a heat pump to re-cycling a large amount of waste heat flow to the input heat side of the cycle, two things are accomplished, 1) the waste heat is no longer wasted, and 2) the required input heat from the outside world is greatly reduced. Both of these greatly increase the cycle efficiency, perhaps as much as from 35% up to 80%.

Figure 18A:
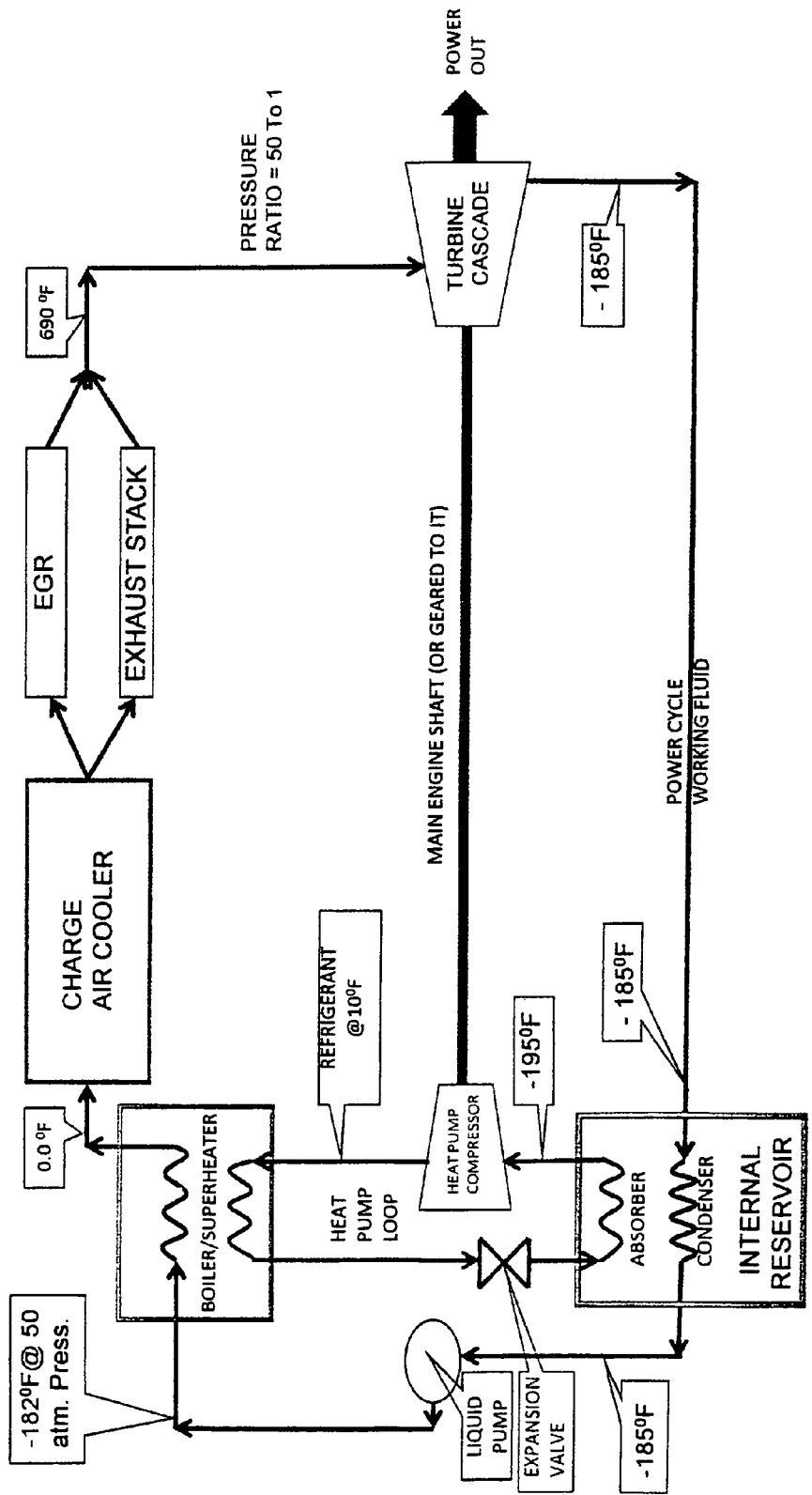
FIG. 18a is a detailed block diagram of a thermodynamic system according to yet another embodiment of the invention used as a Diesel engine bottoming cycle.
Figure 18B:
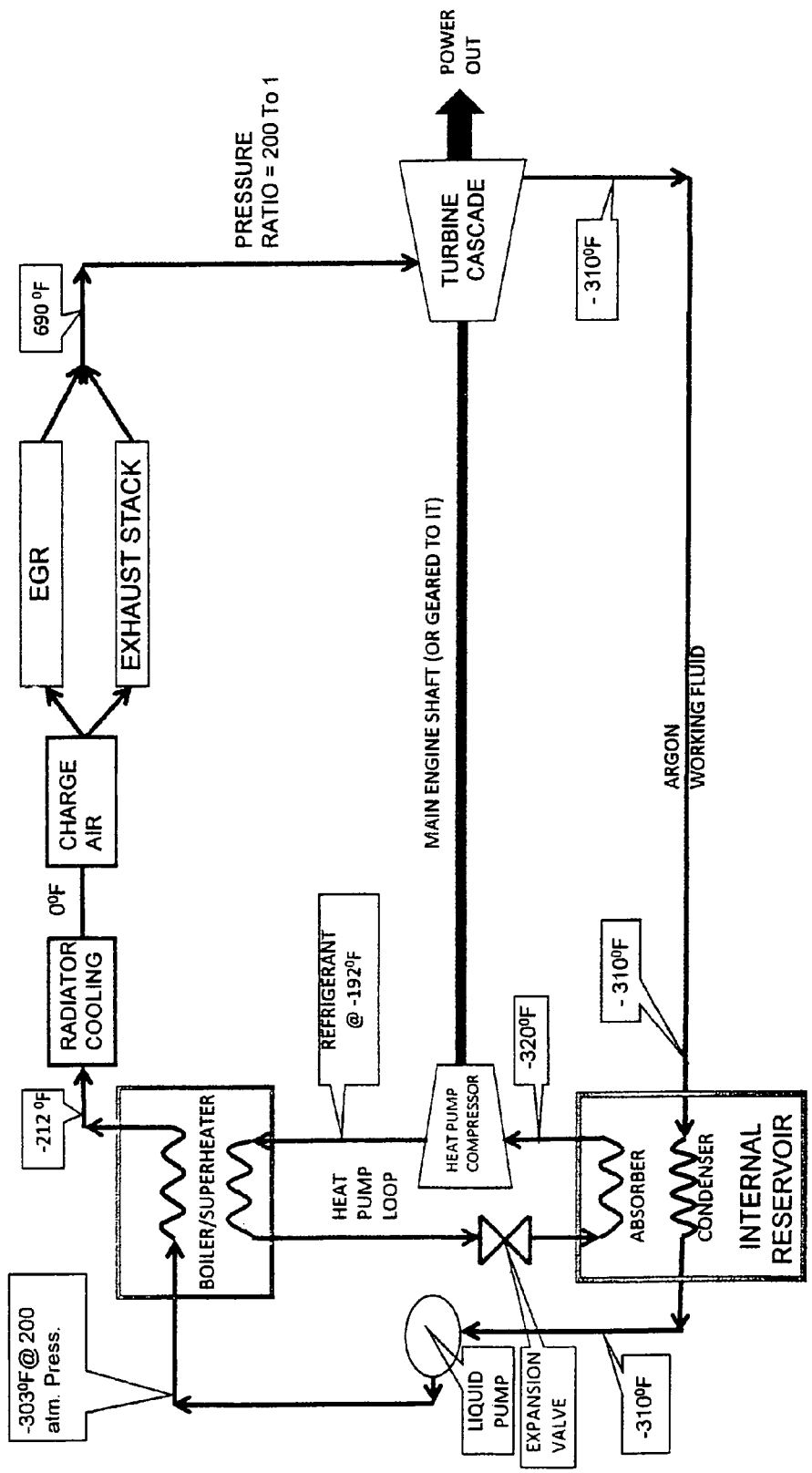
FIG. 18b is the same view as FIG. 18a used to extract heat from a traditional radiator and converted into bottoming cycle work.

FIG. 18*a* is a refined version of FIG. 14 in which some of the waste heat from the charge air cooler, the exhaust gas recirculation (EGR) system and the exhaust stack of a Diesel engine is used to power a Rankine heat-pumped bottoming system. The key to functioning of this system is the thermal gradient of approximately 690 degrees F. found across these components. The recovered heat is sufficient to efficiently power the turbine cascade shown at the bottom right. FIG. 18*b* is the same as FIG. 18*a* except that a heat exchanger is added between the boiler/superheater and the charge air cooler to extract traditional engine radiator heat and convert it to bottoming cycle work. In such an embodiment, a low-temperature working fluid, such as argon, is used.

FIGS. 19*a* through 19*c* show that two distinct reservoirs are not required to power such a system, but that a continuous reservoir with a strong temperature gradient is sufficient.

FIGS. 20*a* and 20*b* compare a high efficiency electrical circuit (FIG. 20*a*) to a heat engine (FIG. 20*b*) with both a liquid pump return and a heat pump return. As with the high efficiency electrical circuit not having to waste significant amounts of energy, the heat engine with a liquid pump return and heat pump return do not require a dump of waste heat to the external environment to have a properly functioning heat-pump Rankine cycle. A continuous flow reservoir is sufficient.

Figure 22:
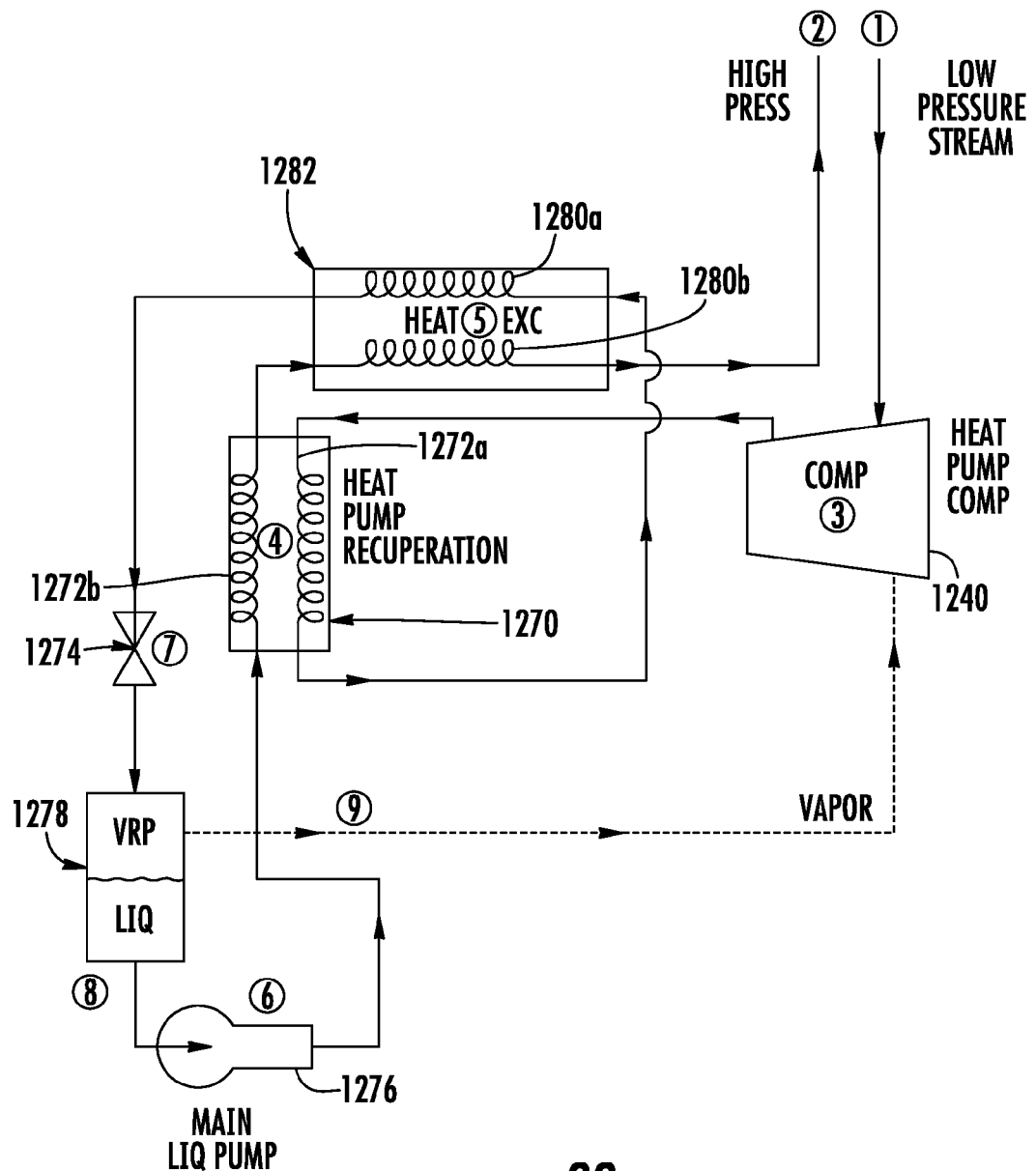
FIG. 22 is the hardware block diagram for the temperature versus entropy subsystem illustrated in FIG. 21.

FIG. 21 shows the temperature versus entropy diagram for a heat-pumping and liquid compression subsystem 1236 which, in turn, may be coupled to a power-producing subsystem, such as of the type illustrated in FIGS. 23 through 29 that are described in more detail below. FIG. 22 illustrates a hardware block diagram implementation of subsystem 126. Subsystem 1236 enables both power production and heat pumping to be accomplished by a single working fluid, unlike the dual fluid systems shown in earlier embodiments of this invention. Circled numbers in FIGS. 21 and 22 are to illustrate comparable portions of the temperature versus entropy diagram in FIG. 21 and the physical system in FIG. 22.

In the upper right of FIG. 21 is shown the high pressure stream (#2) going to the heat source of the power-producing subsystem and the low pressure stream (#1) returning from the low pressure side of the power turbine subsystem. The many variations of the heat source and the many variations of the power-producing turbine subsystems are shown in FIGS. 23 through 29. The high pressure stream follows a normal path in FIG. 21 from left to right across the "wet region." On the other hand, the low pressure stream receives a boost in pressure from the heat pump compressor 1240. This boost in pressure takes the normal returning low pressure stream to a pressure slightly above that of the high pressure stream so that the normal low pressure stream now transfers heat to the high pressure stream using one or more heat exchangers 1270 and 1282 instead of dumping this heat to the ambient. This is shown at #4 and #5 where a large gain in performance (efficiency) can be had. The heat of compression of the heat pump compressor is transferred to the compressed liquid stream, immediately above the liquid pump at #6 in FIG. 21. Once on the saturated liquid side, the elevated low pressure stream goes through an expansion valve 1274, such as a J-T valve, which produces liquid in a tank 1278 with a small residual gas flow that is returned to the heat pump compressor inlet at #9.

The objective of heat pump subsystem 1236 is to conserve heat via a heat-pump system and produce the high pressure stream at #2 that may be supplied to the various subsystems detailed in FIGS. 23 through 29. The incoming low pressure stream #1 is compressed by the heat pump compressor 1240 at #3 so as to have a pressure slightly higher than the outgoing stream #2. Hence, this incoming stream can transfer its heat to the outgoing stream, instead of wasting it to the ambient. The heat of compression of #3 heats the high pressure liquid stream leaving the main liquid pump #6 via heat exchanger 1270. This heat transfer occurs in the "heat pump recuperator" #4, with incoming coil 1272*a* transferring heat to outgoing coil 1272*b*. The heat pump stream now goes through a "flip-flop heat exchanger 1282 at #5," where the slightly elevated pressure of the heat pump stream changes the flow from a gas to a liquid as it exchanges heat with the outgoing high pressure stream #2 which, in turn, changes phases from a liquid to a gas.

The heat-pumped stream, as a liquid, now enters the expansion valve 1274 at #7 which divides the stream into a dominant liquid stream #8 with a smaller vapor stream #9. The vapor stream may be re-circulated back to the low pressure #1 side of the heat pump compressor. The liquid stream component is now compressed by main liquid pump 1276 to the desired high pressure needed by the thermodynamic system. This stream now enters heat pump recuperator #4 as previously described.

Figure 23:
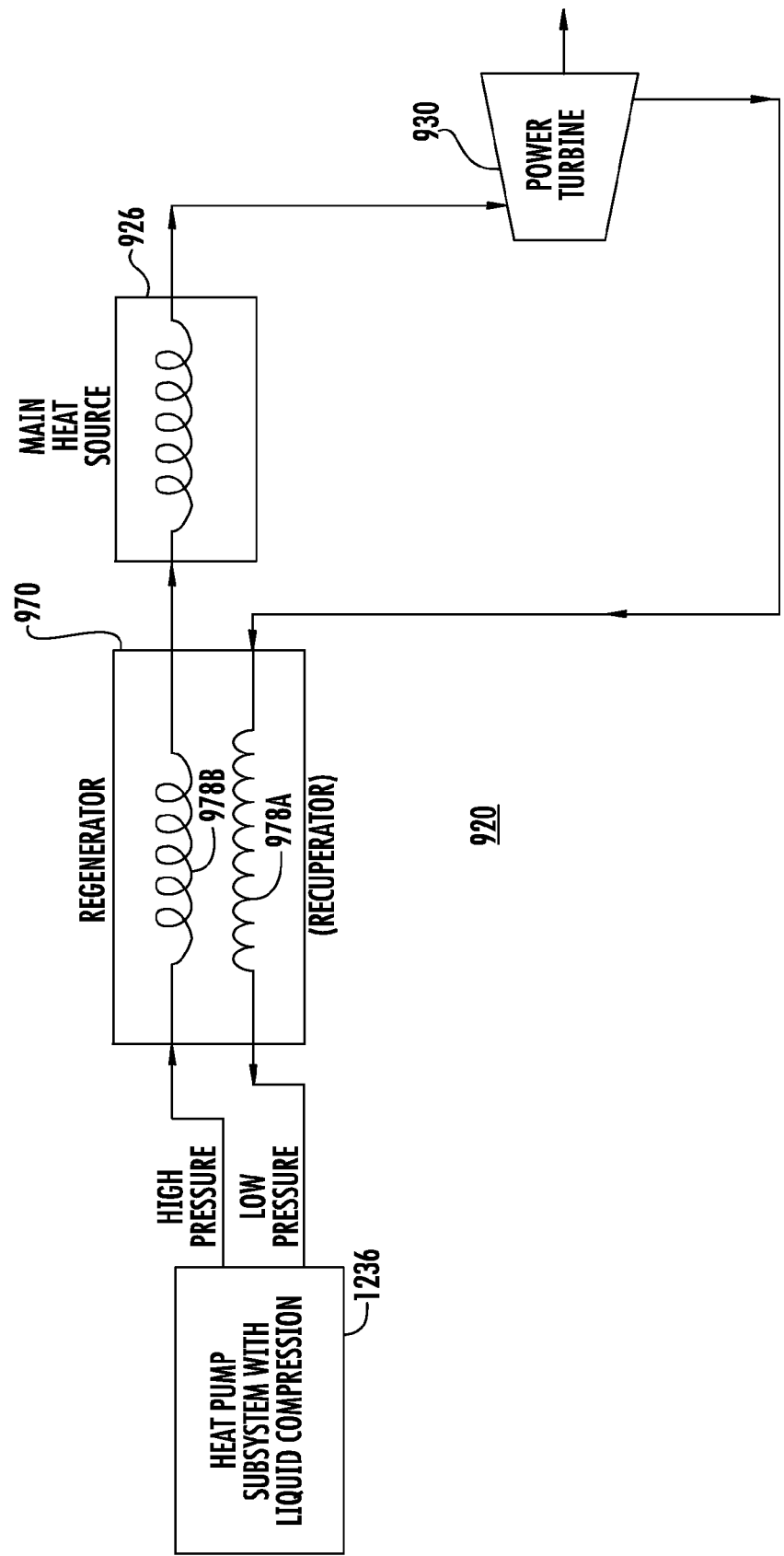
FIG. 23 is a block diagram of a thermodynamic subsystem according to yet another embodiment of the invention employing the single fluid compression/heat-pumping subsystem described in FIGS. 21 and 22.
Figure 24:
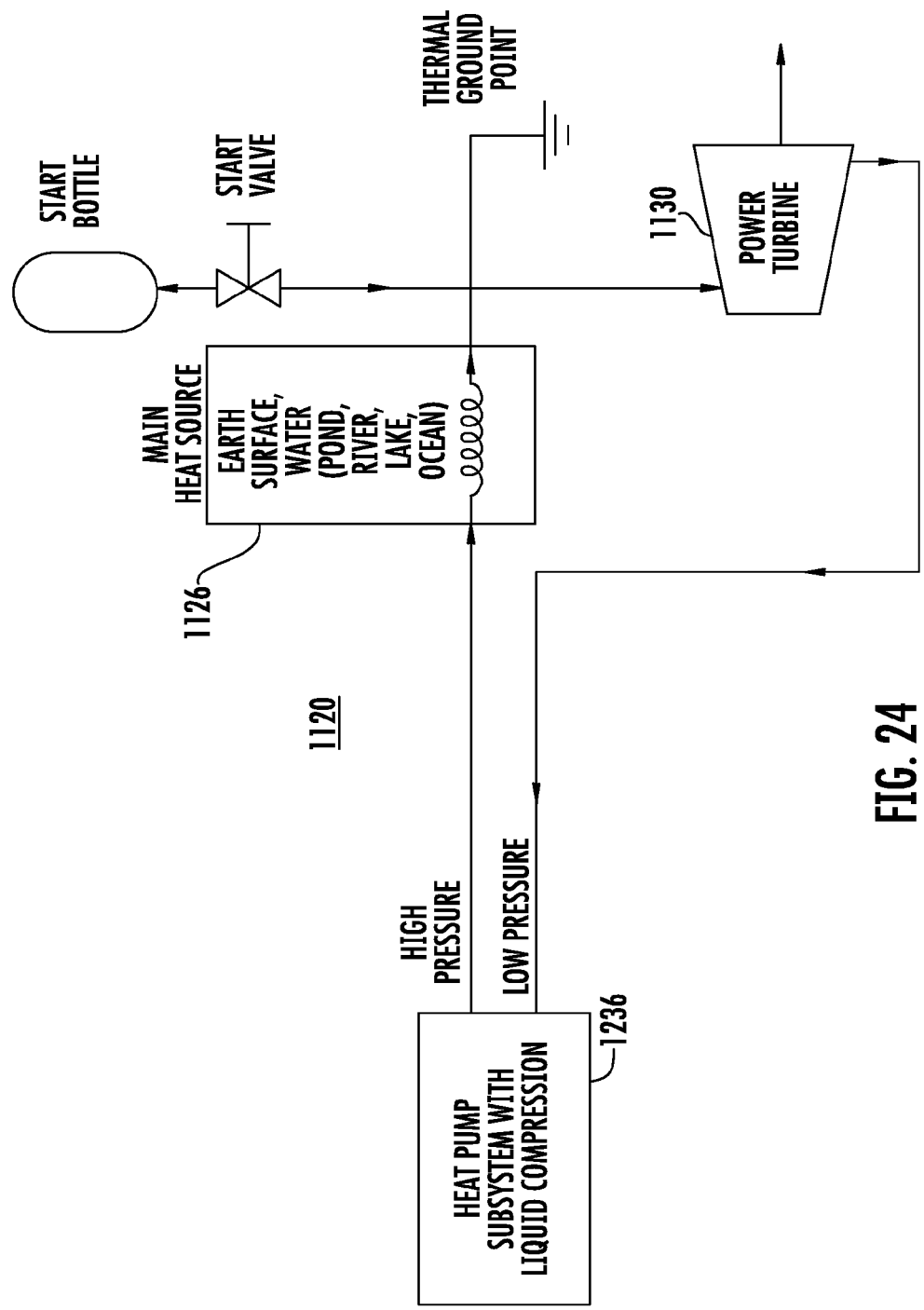
FIG. 24 is a block diagram of a thermodynamic subsystem according to yet another embodiment of the invention employing the single fluid compression/heat-pumping subsystem described in FIGS. 21 and 22.
Figure 25:
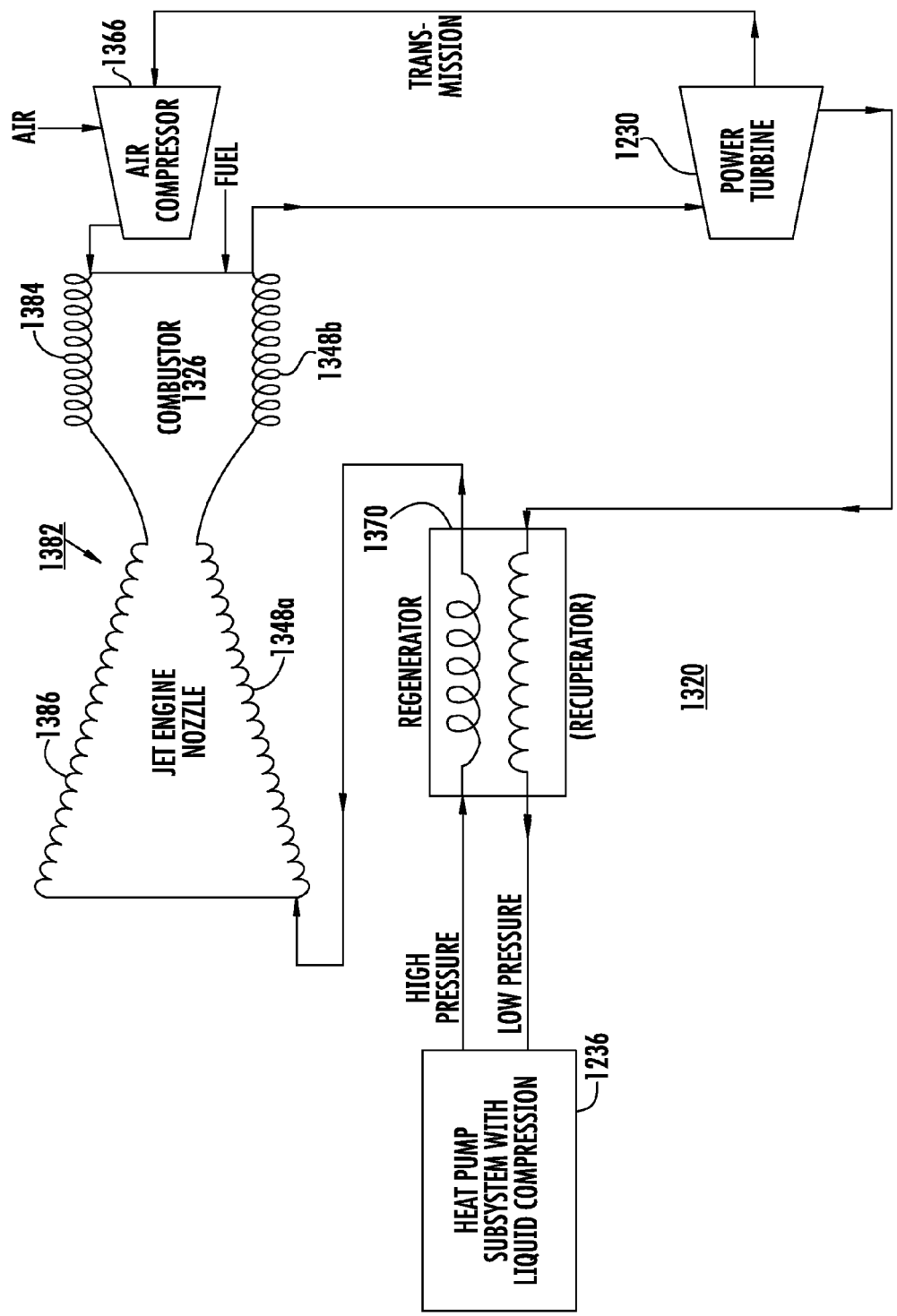
FIG. 25 is a block diagram of a thermodynamic subsystem according to yet another embodiment of the invention employing the single fluid compression/heat-pumping subsystem described in FIGS. 21 and 22.
Figure 26:
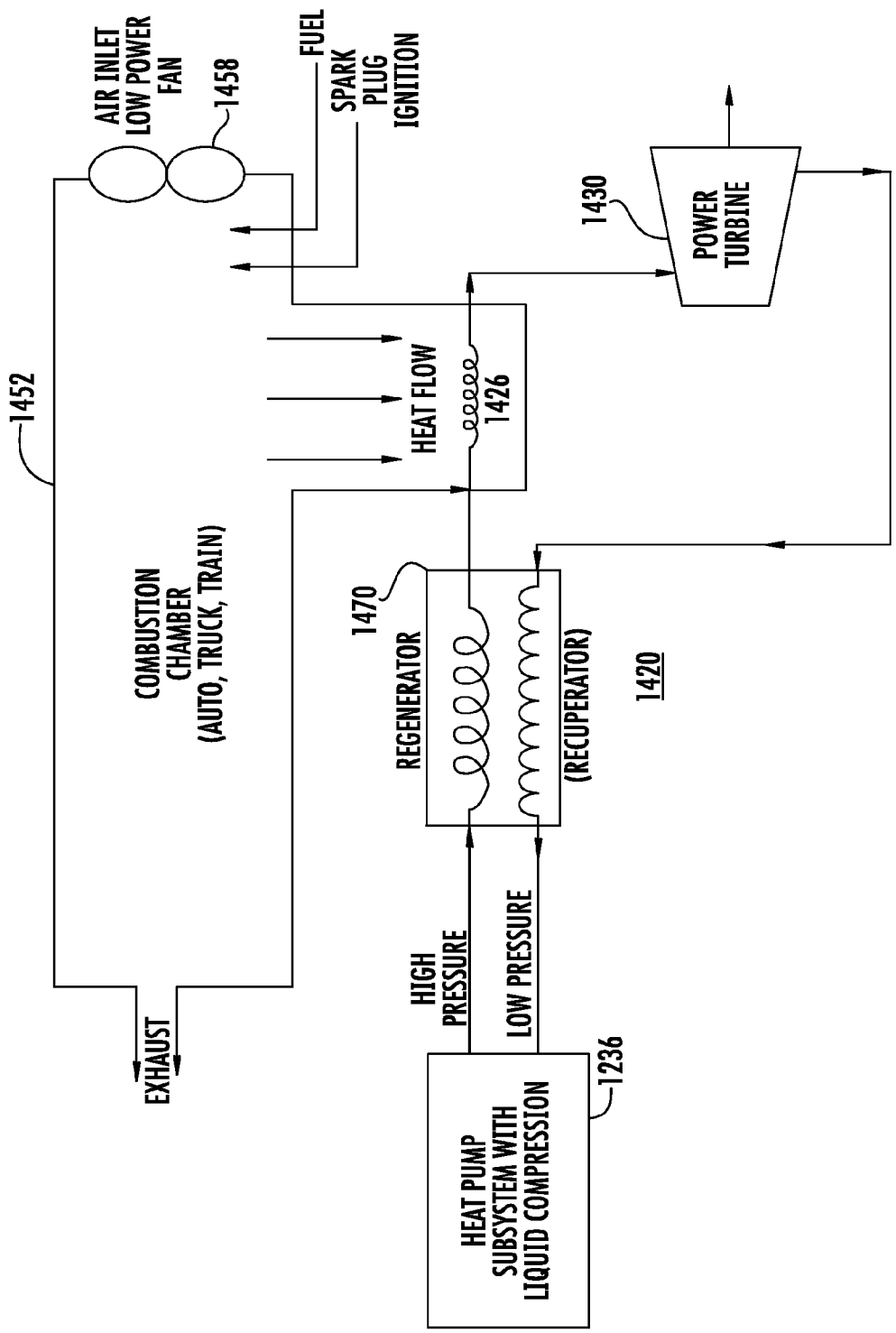
FIG. 26 is a block diagram of a thermodynamic subsystem according to yet another embodiment of the invention employing the single fluid compression/heat-pumping subsystem described in FIGS. 21 and 22.
Figure 27:
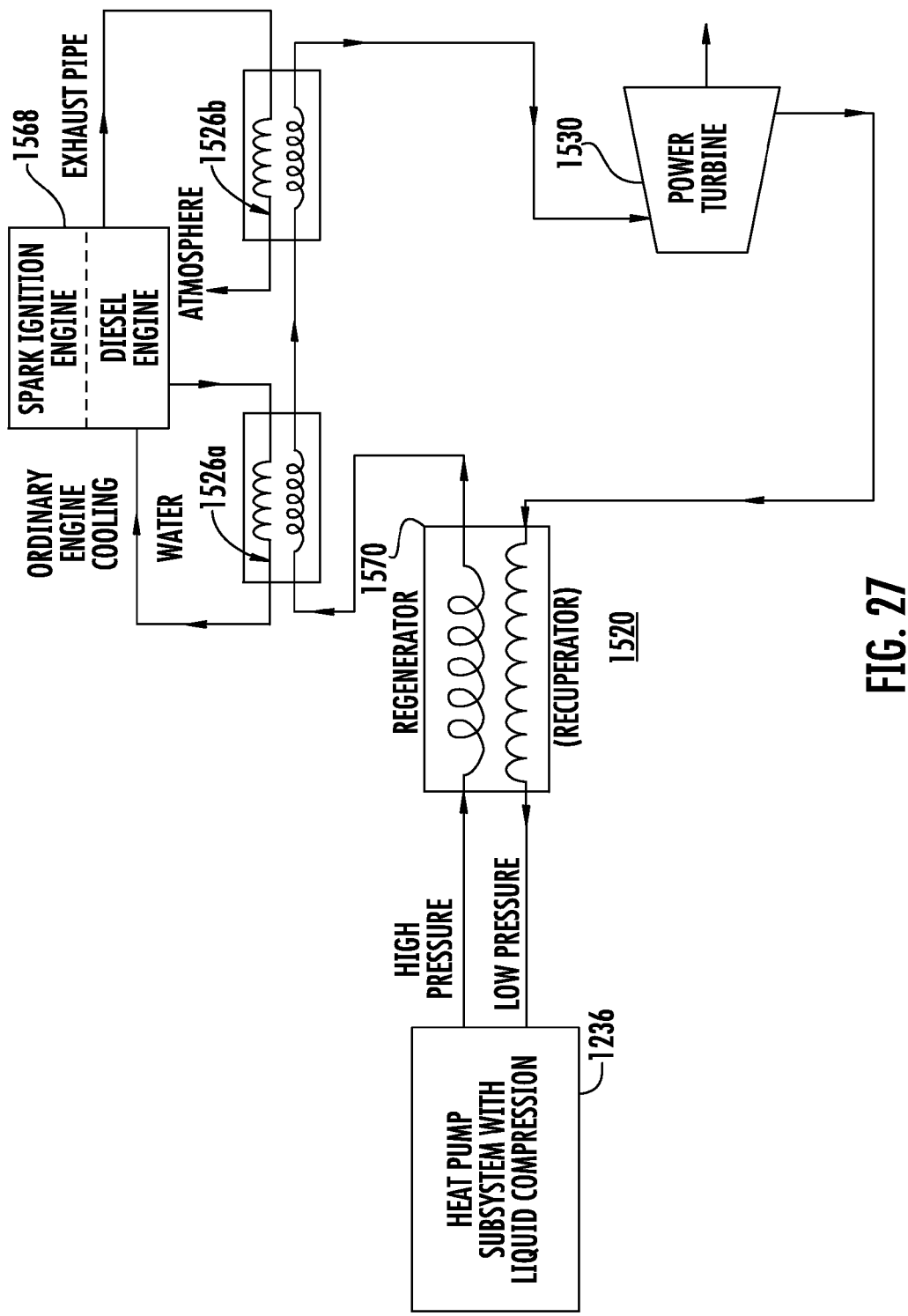
FIG. 27 is a block diagram of a thermodynamic subsystem according to yet another embodiment of the invention employing the single fluid compression/heat-pumping subsystem described in FIGS. 21 and 22.
Figure 28:
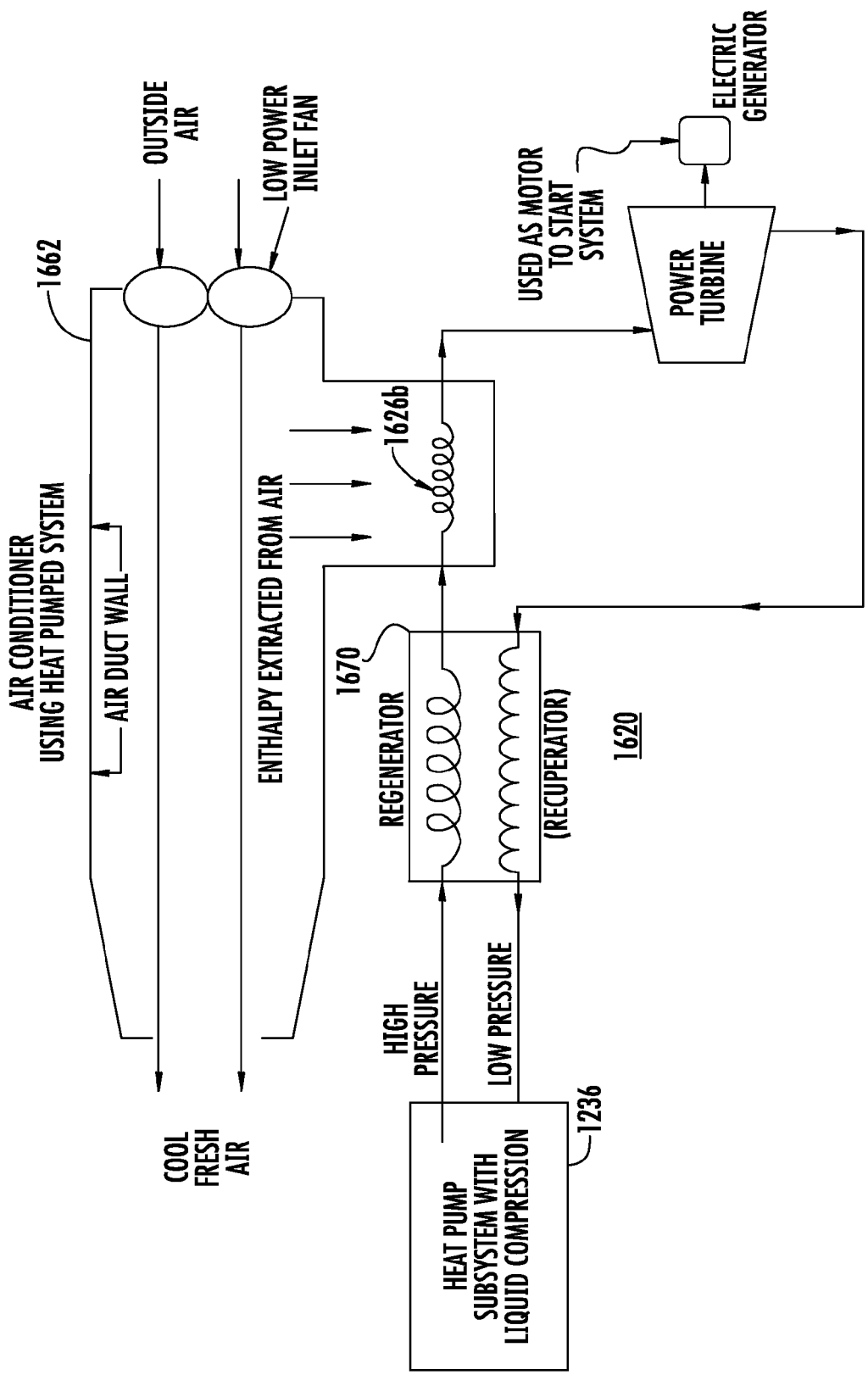
FIG. 28 is a block diagram of a thermodynamic subsystem according to yet another embodiment of the invention employing the single fluid compression/heat-pumping subsystem described in FIGS. 21 and 22.
Figure 29:
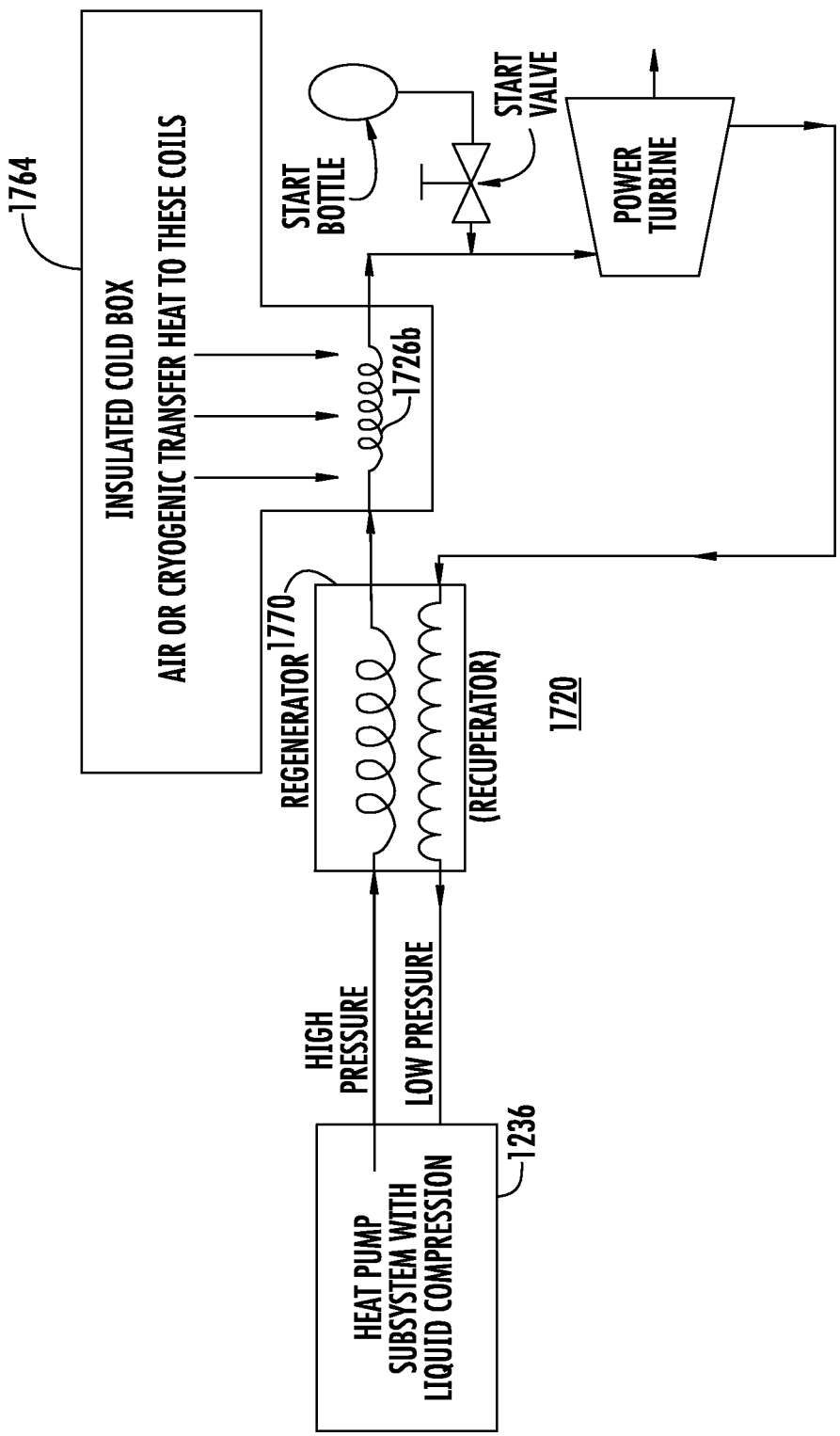
FIG. 29 is a block diagram of a thermodynamic subsystem according to yet another embodiment of the invention employing the single fluid compression/heat-pumping subsystem described in FIGS. 21 and 22.

FIG. 23 illustrates heat pump subsystem 1236 used with a gas turbine subsystem embodiment of a thermodynamic system 920 that utilizes a regenerator 970, which is also known in the state of the art as a recuperator, having a first heat transfer coil 978*a* in the return stream exiting turbine 930 and a second heat transfer coil 978*b* in the high pressure stream incoming to thermal input 926. Regenerator 970 is passive in that heat is transferred from coil 978*a* to coil 978*b* as long as the temperature in the return stream is higher than the temperature in the high pressure stream. Subsystem 920 is tied directly to the heat-pump/liquid compression subsystem 1236 through the respective high pressure and low pressure lines to produce power.

A thermodynamic subsystem 1120 (FIG. 24) has a thermal input 1126 that may be similar to thermal input 226 and a power turbine 1130 that may be similar to turbine 230. It utilizes the heat-pump/liquid compression subsystem 1236 through the respective high pressure and low pressure lines to produce power.

A thermodynamic subsystem 1320 (FIG. 25) for a jet engine 1382 having a combustor 1382 serving as a heat input 1326 that may be similar to thermal input 426 and a power turbine 1230 that may be similar to turbine 430 to drive a combustion air compressor 1366 that is similar to compressor 66. System 1320 utilizes the heat-pump/liquid compression subsystem 1236 in the production of thrust.

A thermodynamic subsystem 1420 (FIG. 26) in the form of an air-breathing external combustion engine, such as for land vehicles, has a combustion chamber 1452 that may be similar to combustion chamber 552 and a low power input fan 1458 similar to fan 58 to ensure uniform combustion and to push the exhaust products out the exhaust. System 1420 includes a thermal input 1426 that may be similar to thermal input 526, and a power turbine 1430 that may be similar to power turbine 530. This subsystem utilizes heat-pump/liquid compression subsystem 1236 in the production of power.

A thermodynamic subsystem 1520 (FIG. 27) that can be used as an add-on bottoming cycle for an internal combustion engine or Diesel engine 1568 includes thermal inputs 1526a and 1526b that may be similar to thermal inputs 626a and 626b and a power turbine 1530. This subsystem utilizes heat-pump/liquid compression subsystem 1236 in the production of power.

A thermodynamic subsystem 1620 (FIG. 28) that can be used to extract heat from ambient air includes an air duct assembly 1662 that may be similar to air duct assembly 62 having a heat exchange coil 1626b that may be similar to coil 726b. This subsystem utilizes heat-pump/liquid compression subsystem 1236 in the production of air conditioning.

A thermodynamic subsystem 1720 (FIG. 29) that can be used with a refrigerator or Dewar to produce, for example, cryogenic fluids includes a cold box 1764 that may be similar to cold box 64 having a coil 1726 that may be similar to coils 826a and/or 826b. This subsystem utilizes heat-pump/liquid compression subsystem 1236 in the production of cryogenic fluids.

Figure 30:
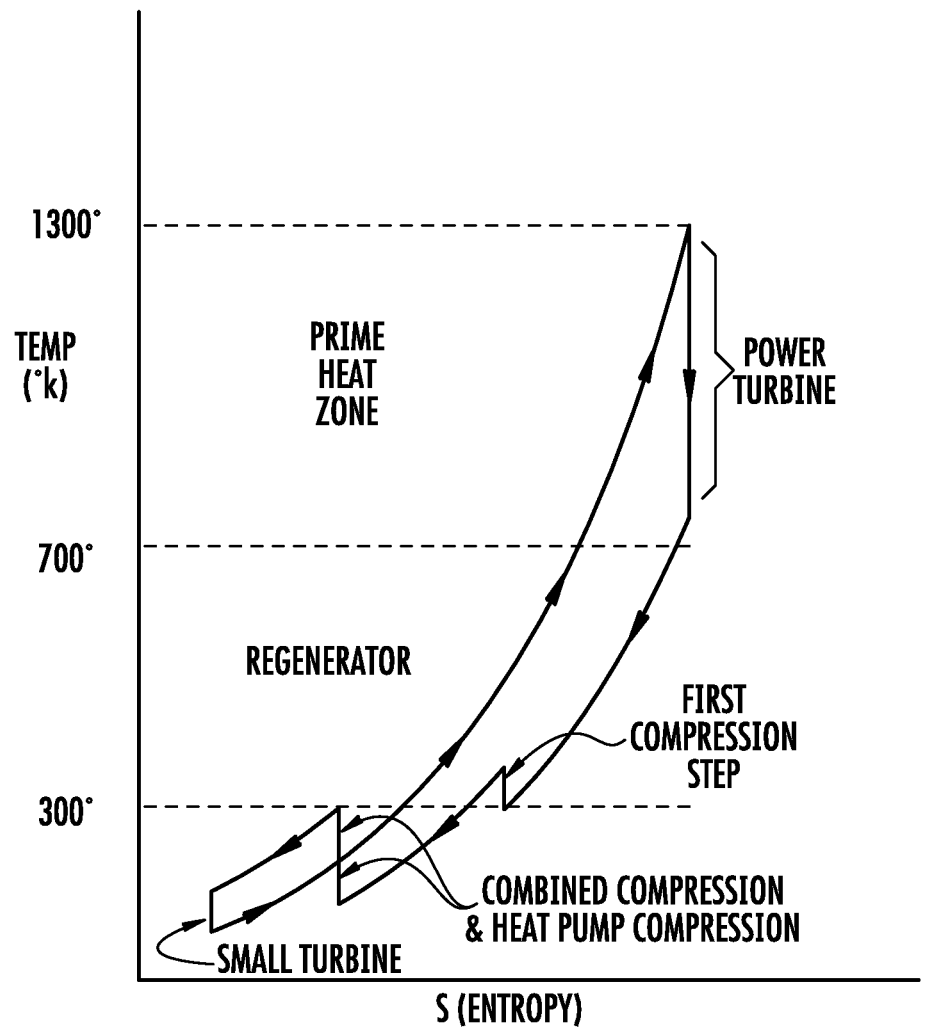
FIG. 30 is a temperature versus entropy diagram for the thermodynamic system according to yet another embodiment of the invention.

FIG. 30 is a temperature versus entropy diagram for a Brayton cycle system in which the heat pump is combined into the main power cycle much as the heat pump is combined into the main power cycle of FIG. 21. The near-isentropic compression is broken into at least two stages, and perhaps more. At the low temperature point at which the regenerator reaches its pinch point, compression starts so as to reach approximately one-half (or perhaps one-third or one-fourth) of final system pressure. This process allows more of the low pressure heat to be transferred to the high pressure stream. The final compression step not only elevates the low pressure stream to the pressure needed by the system power turbine, but goes higher so as to function as a heat pump transferring the final increment of heat to the incoming stream. A small power turbine may be used to take out a small increment of enthalpy so as to close the thermodynamic loop. This FIG. 30 Brayton cycle is analogous to the Rankine cycle of FIG. 21.

Figure 31:
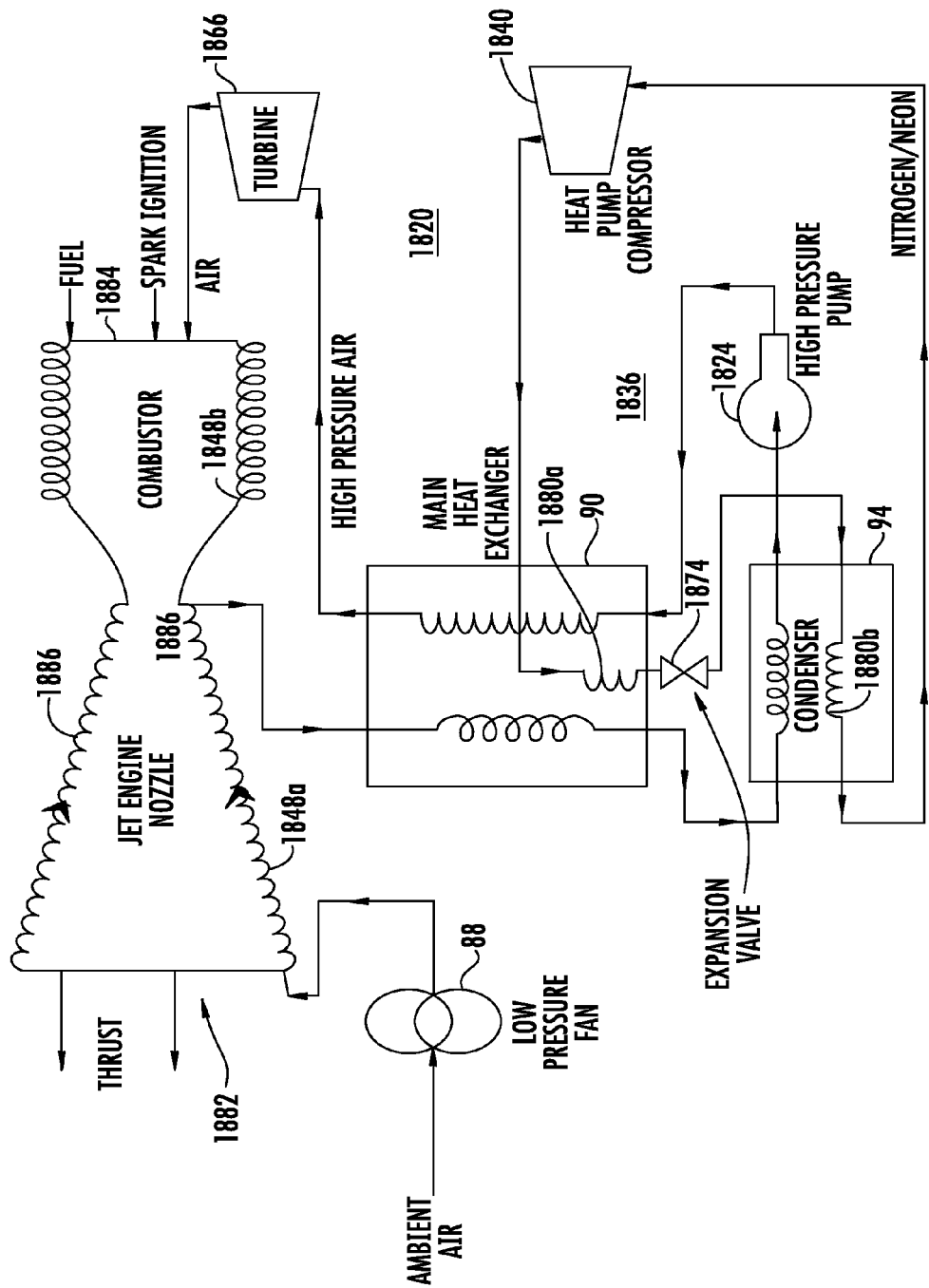
FIG. 31 is a block diagram of a thermodynamic system according to yet another embodiment of the invention.

FIG. 31 is a block diagram of an aircraft jet engine thermodynamic system 1820 according to yet another embodiment of the invention. Like system 420 of FIG. 12 and system 1320 of FIG. 25, the walls of the thrust chamber 1886 of a jet engine 1882 are cooled by the working fluid that drives the turbo-machinery that produces the system pressure. This step also reduces the exit temperature of the thrust stream, thus increasing the thermodynamic efficiency of the main engine. Unlike FIGS. 12 and 25, the incoming air is cooled down to the liquid state and compressed as a liquid to a very high pressure, nominally 60 atmospheres (880 psia). A heat pump loop balances up the cryogenic system so that no significant heat is lost.

The incoming air of system 1820 may be slightly compressed to 2 or 3 atmospheres by a low pressure fan 88. The air then enters the cooling coils 1848a, 1848b of the engine thrust chamber absorbing substantial heat. From there, the air enters a main heat exchanger 90 to be cooled to a saturated gas and then to a saturated liquid. The latent heat of the saturated gaseous air is removed by a heat pump 1836 having a compressor 1840, an expansion valve 1874 and coils 1880a and 1880b. Heat pump 1836 receives a lower temperature latent heat from heat exchanger 90 that includes coil 1880a and this heat is then transferred to the high pressure air stream by a heat exchanger 94 that includes coil 1880b. The liquid air is pumped to a very high pressure by a high pressure pump 1824 and reheated to above ambient conditions by heat exchanger 90. A small pressure drop is taken in this air stream to drive the power turbine 1866. The high pressure air then enters the thrust chamber 1884.

Compressing an air stream as a liquid, rather than as a gas, allows next generation jet engine combustors to operate at approximately 2,000 degrees Fahrenheit instead of the presently used 3,200 degrees with 60 atmosphere gaseous compression. This reduces combustor designs to present state of art instead of advanced state of art with exotic materials and strenuous reliability specifications. Also, by removing the air compressor from the hot gas stream, reliability of the system is enhanced.

Figure 32:
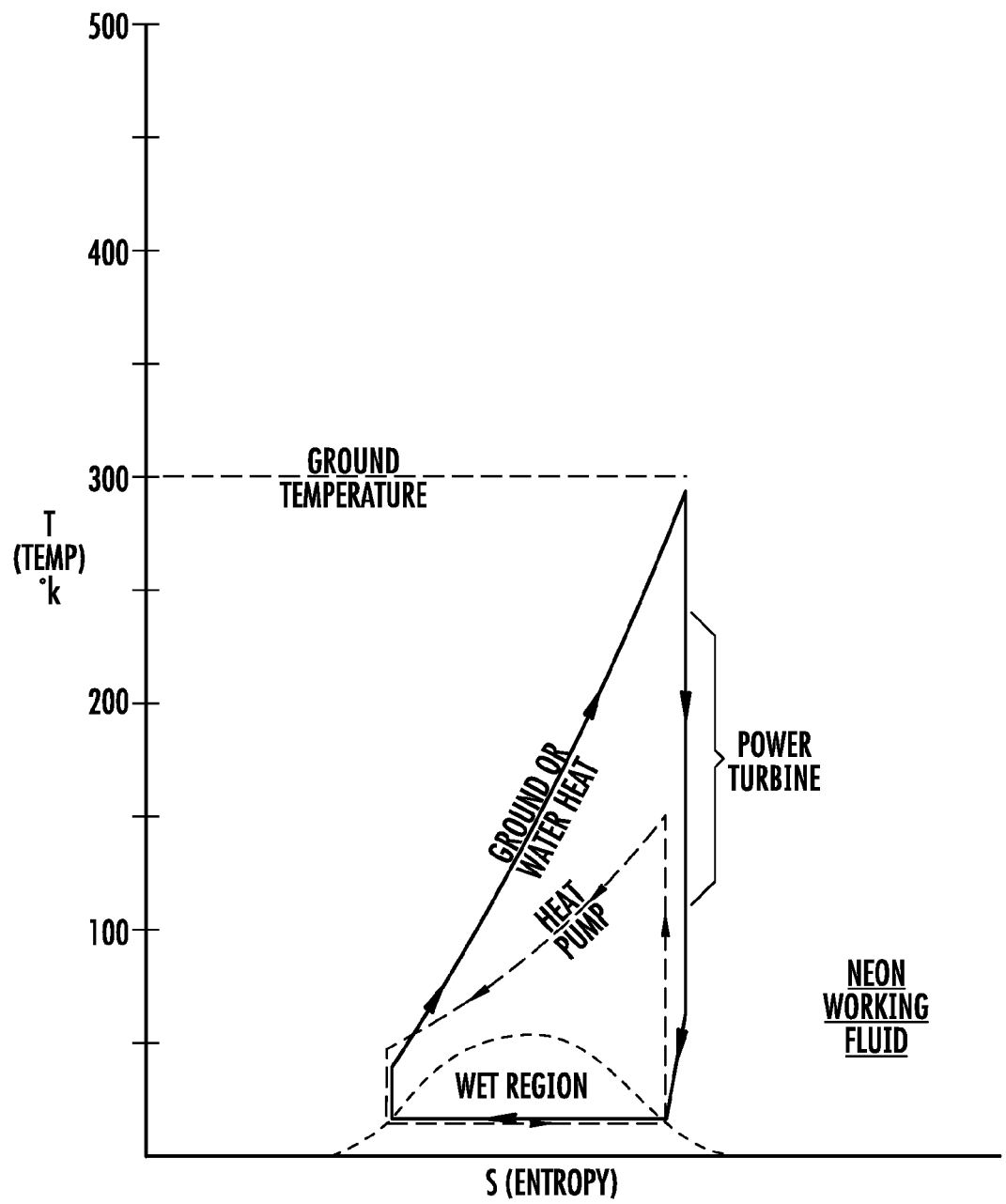
FIG. 32 is a temperature versus entropy diagram for the thermodynamic system according to yet another embodiment of the invention.

FIG. 32 shows a variation of FIG. 8, wherein the power system working fluid is neon. For an in-ground system to extract substantial heat, the critical temperature must be quite low (44 degrees Kelvin). The critical temperature of argon of 151 degrees Kelvin may be too high for ground or surface water heating.

Figure 33:
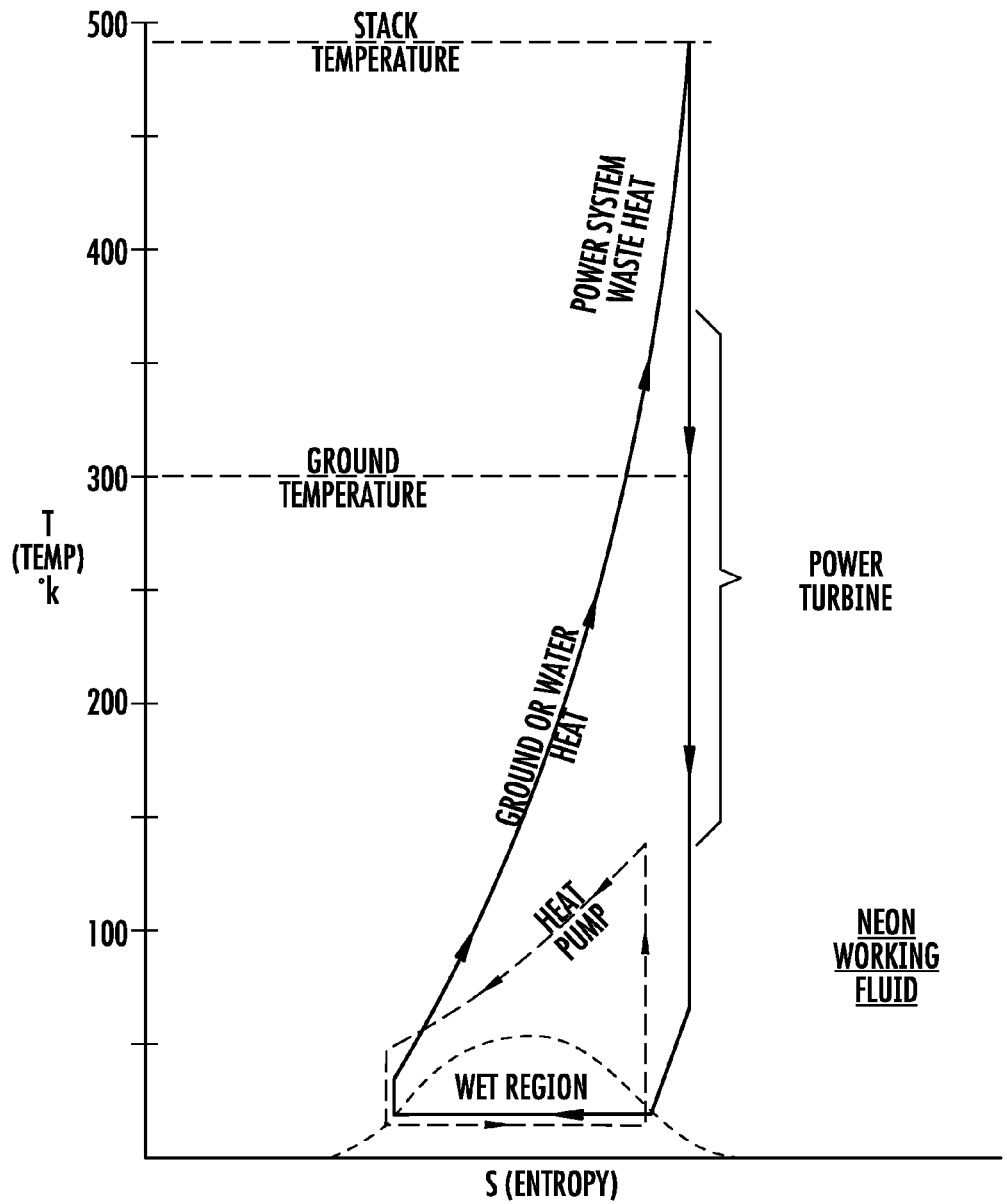
FIG. 33 is a temperature versus entropy diagram for the thermodynamic system according to yet another embodiment of the invention.

FIG. 33 shows a second variation of FIG. 8 with neon. Here, with a slightly higher pressure, the power system can extend well above ambient. Hence, when a power plant is being retrofitted for extracting power from low grade heat, the design could readily extract power from ground or surface water heat as well.

Figure 34:
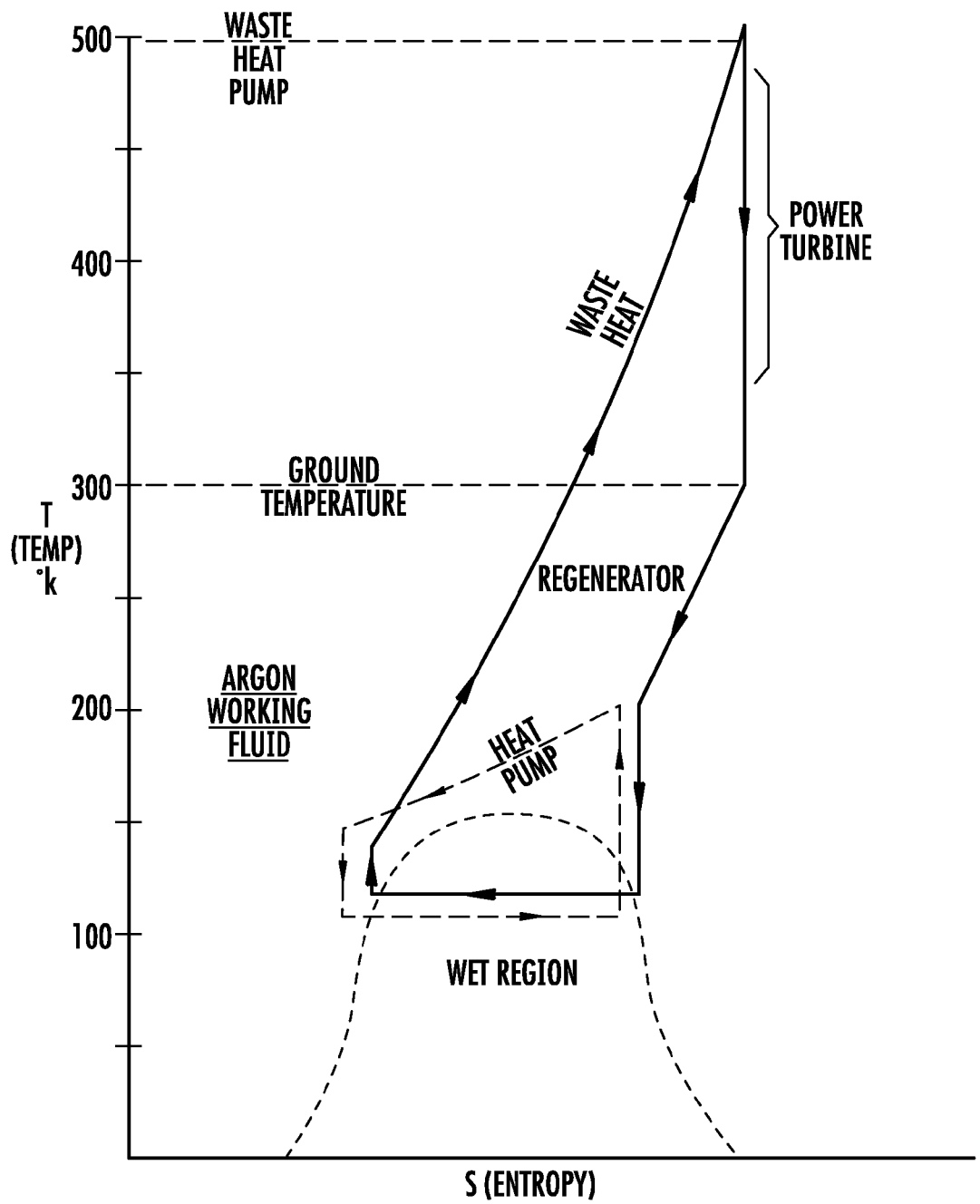
FIG. 34 is a temperature versus entropy diagram for the thermodynamic system according to yet another embodiment of the invention.

FIG. 34 shows that argon may be used as a fluid for extracting power from waste heat of power plants. A regenerator is illustrated to bridge from ambient down to argon's saturated conditions. Xenon may, alternatively, be used as the working fluid, in which case no regenerator may be needed.

Figure 35A:
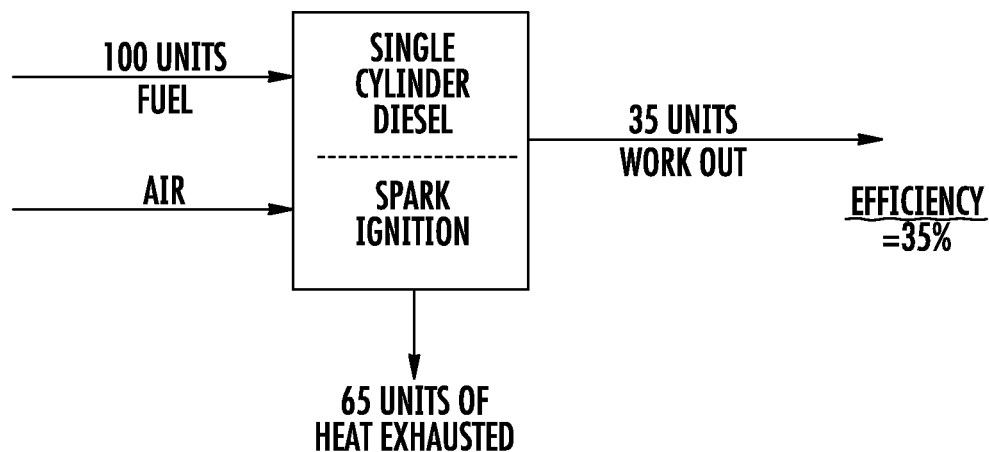
FIGS. 35a and 35b are block diagrams comparing the operation of an existing single cylinder of either a Diesel or spark ignition engine with the operation of a high-performance heat-pumped single cylinder employing a very substantial re-circulation of exhaust gases back to the intake of the cylinder.
Figure 35B:
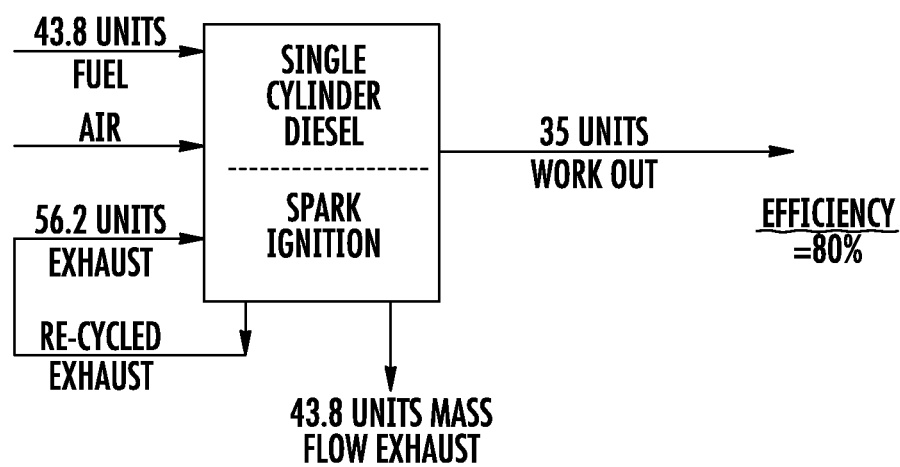

FIGS. 35a and 35b compare an existing power-producing cylinder for either a spark ignition engine or a Diesel engine (FIG. 35a) to a cylinder modified to re-cycle a very substantial amount (perhaps two-thirds) of the hot exhaust flow back to the inlet of the cylinder (FIG. 35b). Here, heat is pumped by literally pumping the hot mass itself back to the inlet. Careful valve timing and careful shaping of flow ducts will further reduce losses. Gains in engine efficiency from 35% to 80% appear achievable.

Figure 36:
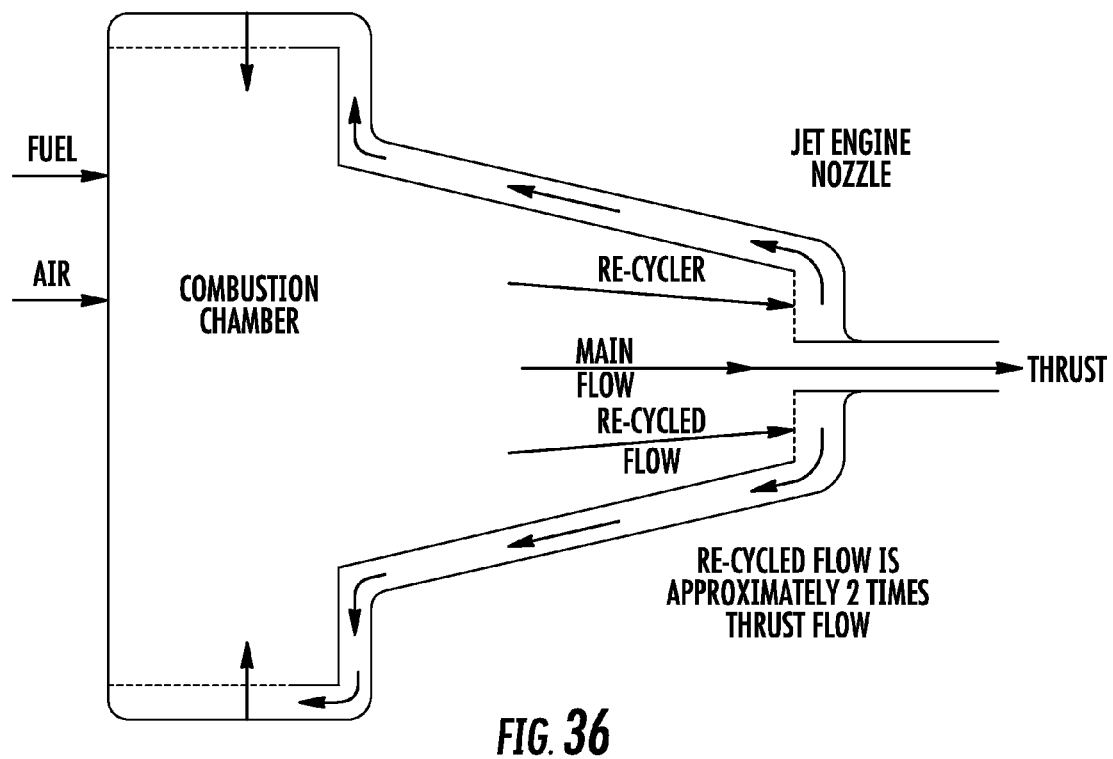
FIG. 36 is a schematic diagram of a jet engine nozzle that provides for a very substantial re-circulation of the exhaust stream back to the engine stagnation region or combustion chamber resulting in substantial improvement in performance.

FIG. 36 shows an aircraft engine nozzle design in which a substantial fraction (perhaps two-thirds) of the thrust stream is captured near the exit plane and re-circulated to the engine combustor to increase engine efficiency. This is quite similar to the re-circulated flow shown in the auto/Diesel engine of FIG. 35. Here again, careful contouring of all surfaces must be followed to avoid losses and in particular to prevent shock waves. Efficiency gains from 35% to 80% appear possible.

Thermal gradients for the various embodiments of a thermodynamic system described herein are established by the approximate isentropic power-producing expansion device, such as an expansion turbine, gas turbine, jet nozzle, or the like. As with all thermodynamic systems, parasitic losses, such as bearing friction, combustor losses and heat leaks will be present and will reduce system efficiency. It should be understood that system components, both those operating above and below ambient, will utilize good insulating techniques to reduce unwanted heat leaks or unwanted heat inputs, as would be understood by the skilled artisan. Also, known control techniques can be used to maintain system balance, such as between the power cycle and the heat pump cycle. Such techniques may include adjustments to the turbine, fluid pump, heat pump compressor, and the like. Use of expansion valves should be kept to a minimum and used primarily in the heat pump loop so as to reduce thermodynamic irreversibility. Expansion valves are best fixed and not used as part of a control loop. However, variations would be apparent to the skilled artisan.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A thermodynamic system, comprising:
   a working fluid;
   a fluid pump for pumping the working fluid through a cycle;
   a thermal input for supplying heat to the working fluid;
   an expansion device downstream of the thermal input for converting motion of the working fluid to useful work; and
   a heat pump, said heat pump pumping heat from a first portion of said working fluid to a second portion of the working fluid that is at a higher temperature than is said first portion of said working fluid, said second portion of the working fluid being at or upstream of said thermal input, wherein said heat pump comprises a vapor compression heat pump, wherein said system comprises an air-breathing engine having a fuel combustor and fuel and air intakes to said combustor, wherein said air-breathing engine comprises a jet engine having a nozzle connected with said fuel combustor and wherein said thermal input removes heat from said nozzle.

2. The system as claimed in claim 1 wherein said first portion of said working fluid being a minimum temperature point of the working fluid.

3. The system as claimed in claim 1 wherein said first portion of said working fluid being downstream of said expansion device.

4. The system as claimed in claim 1 wherein said working fluid operates in a cryogenic temperature region, wherein said working fluid comprises at least one chosen helium, hydrogen, nitrogen, argon, neon, xenon and krypton.

5. The system as claimed in claim 1 wherein said heat pump utilizes another working fluid.

6. The system as claimed in claim 5 wherein said another working fluid comprises at least one chosen from an HFC compound, ammonia, propane, propylene, butane, isobutene, ethane, argon, krypton and neon.

7. The system as claimed in claim 1 wherein said working fluid and said heat pump utilize a common working fluid.

8. A thermodynamic system, comprising:
   a power cycle subsystem that is adapted to provide useful work and an efficiency enhancing subsystem that is adapted to enhancing efficiency of said power cycle subsystem, said subsystems utilizing a common working fluid flowing continuously through said subsystems and a liquid pump that is adapted to pump the working fluid continuously through said subsystems;
   said power cycle subsystem including a thermal input for supplying heat to the working fluid and an expansion device downstream of the thermal input for converting motion of the working fluid to useful work; and
   said efficiency enhancing subsystem including a heat pump, said heat pump pumping heat from a first portion of said working fluid to a second portion of the working fluid that is at a higher temperature than said first portion, wherein said heat pump includes a vapor compressor that is adapted to compress said working fluid from a vapor state downstream of said expansion device thereby generating heat of compression, said liquid pump being downstream of said compressor and said heat pump further including a heat exchanger that transfers the heat of compression to the working fluid downstream of said liquid pump.

9. The system as claimed in claim 1 wherein said expansion device comprises a turbine.

10. The system as claimed in claim 8 wherein said thermal input comprises a boiler and wherein said heat pump pumps heat at said boiler.

11. The system as claimed in claim 10 wherein said thermal input comprises a super heater and wherein said heat pump comprises a condenser delivering heat at said super heater.

12. The system as claimed in claim 8 wherein said thermal input comprises an ambient substance at standard ambient temperature, said ambient substance comprises at least one chosen from surface water, a geothermal source and earth's surface.

13. The system as claimed in claim 12 including a starting device for starting flow of said working fluid.

14. The system as claimed in claim 12 wherein said one portion of said working fluid is below standard ambient temperature.

15. A thermodynamic system, comprising:
   a working fluid;
   a fluid pump for pumping the working fluid through a cycle;
   a thermal input for supplying heat to the working fluid;
   an expansion device downstream of the thermal input for converting motion of the working fluid to useful work; and
   a heat pump, said heat pump pumping heat from a first portion of said working fluid to a second portion of the working fluid, wherein said system comprises an air-breathing engine having a fuel combustor and fuel and air intakes to said combustor, wherein said air-breathing engine comprises a jet engine having a nozzle connected with said fuel combustor and wherein said thermal input removes heat from said nozzle, wherein said heat pump comprises a turbine and wherein said turbine drives an air compressor supplying air to said fuel combustor.

16. The system as claimed in claim 1 wherein said system comprises a bottoming cycle for improving efficiency of said engine, wherein said thermal input receives waste heat produced by said engine.

17. The system as claimed in claim 8 wherein said system comprises an end-use fluid-cooling system.

18. The system as claimed in claim 17 wherein said fluid-cooling system is adapted to generate cryogenic fluids or to cool air as an end-use fluid.

19. The system as claimed in claim 17 wherein said thermal input receives heat extracted from the end-use fluid.

20. The system as claimed in claim 17 including a starting device for starting flow of said working fluid.

21. The system as claimed in claim 8 including a passive regenerator transferring heat from a third portion of said working fluid to a fourth portion of said working fluid.

22. The system as claimed in claim 21 wherein said first portion of said working fluid is downstream of said third portion of said working fluid with respect to flow of said working fluid and said second portion of said working fluid is upstream of said fourth portion of said working fluid with respect to flow of said working fluid.

23. The system as claimed in claim 22 wherein said regenerator has a pinch point with respect to flow of said working fluid wherein said portion of said working fluid is downstream of the pinch point of said regenerator.

24. An efficiency enhancing subsystem for enhancing efficiency of a power cycle system having a working fluid, a thermal input for supplying heat to the working fluid and an expansion device downstream of the thermal input for converting energy of the working fluid to useful work, said efficiency enhancing subsystem comprising:

a heat pump, said heat pump pumping heat from one portion of said working fluid to another portion of the working fluid at a higher temperature than the one portion, wherein the expansion device and said heat pump utilize a common working fluid flowing continuously through said power cycle system and said heat pump, wherein said heat pump includes a vapor compressor that is adapted to compress said working fluid from a vapor state downstream of the expansion device thereby generating heat of compression, a liquid pump downstream of said compressor that is adapted to pump the working fluid continuously through said power cycle system and said heat pump and a heat exchanger that transfers the heat of compression to the working fluid downstream of said liquid pump.

25. The efficiency enhancing subsystem as claimed in claim 24 wherein said vapor compressor compressing the working fluid from a vapor state to a liquid state and wherein said heat pump includes another expansion valve downstream of said compressor.

26. The efficiency enhancing subsystem as claimed in claim 25 wherein said liquid pump is downstream of said another expansion valve for raising the pressure of the working fluid in the liquid state.

27. The thermodynamic system as claimed in claim 8 wherein said vapor compressor compressing the working fluid from a vapor state to a liquid state and wherein said heat pump includes another expansion valve downstream of said compressor.

28. The thermodynamic system as claimed in claim 27 wherein said liquid pump is downstream of said another expansion valve for raising the pressure of the working fluid in the liquid state.

* * * * *